United States Patent [19]
Baldwin et al.

[11] Patent Number: 4,725,968
[45] Date of Patent: Feb. 16, 1988

[54] DISK DRIVE TESTING METHOD AND APPARATUS

[75] Inventors: Dale B. Baldwin; Barry G. Heist, both of Madison; Michael J. McKinney, Mount Horeb, all of Wis.

[73] Assignee: Nicolet Instrument Corporation, Madison, Wis.

[21] Appl. No.: 734,020

[22] Filed: May 14, 1985

[51] Int. Cl.$^4$ .................... G06F 11/32; G11B 21/10
[52] U.S. Cl. ..................... 364/550; 360/31; 360/25
[58] Field of Search ............ 364/550, 900; 360/77, 360/78, 25, 31; 371/21

[56] References Cited

U.S. PATENT DOCUMENTS

| | | | |
|---|---|---|---|
| 3,953,889 | 4/1976 | Scieszinski et al. | 360/77 |
| 4,103,338 | 7/1978 | Cizmic et al. | 364/900 |
| 4,152,695 | 5/1979 | Democrate et al. | 371/21 |
| 4,268,905 | 5/1981 | Johann et al. | 364/200 |
| 4,333,177 | 6/1982 | Sutterlin | 360/31 |
| 4,414,589 | 11/1983 | Oliver et al. | 360/77 |
| 4,504,871 | 3/1985 | Berwick et al. | 360/31 |
| 4,562,562 | 12/1985 | Moriya et al. | 369/32 |
| 4,608,618 | 8/1986 | Sturtevant-Stuart | 360/135 |

Primary Examiner—Felix D. Gruber
Assistant Examiner—Thomas G. Black
Attorney, Agent, or Firm—Isaksen, Lathrop, Esch, Hart & Clark

[57] ABSTRACT

A disk drive testing apparatus (20) is disclosed which provides substantially automatic cycling through various tests of disk drive units. A graphical display is provided on a screen (25) to the operator to allow the operator to determine whether the disk drive is performing in or out of specifications which may be read into the apparatus from an EEPROM memory module (26). By pressing a single TEST switch (22) on the tester, the operator can cycle through a preselected series of tests on the drive unit. The tester 20 is controlled by a microcomputer central processing unit (42) to cycle through the tests and to provide a display on the screen (25) for selected tests which includes a graphics field defining a performance reference frame including a geometric target specification position, a geometric pass range, and a geometric fail range. A figure is superimposed on the graphics field which is displaced geometrically from the target specification position by a distance which is directly related to a performance variable determined by comparing a signal from the disk drive with a specification reference. The tester also provides an analysis of the probability of disk reading and writing errors and displays a graph (365) illustrating the likelihood that data bit timing from the disk drive will remain within selected window margins over long periods of time.

27 Claims, 22 Drawing Figures

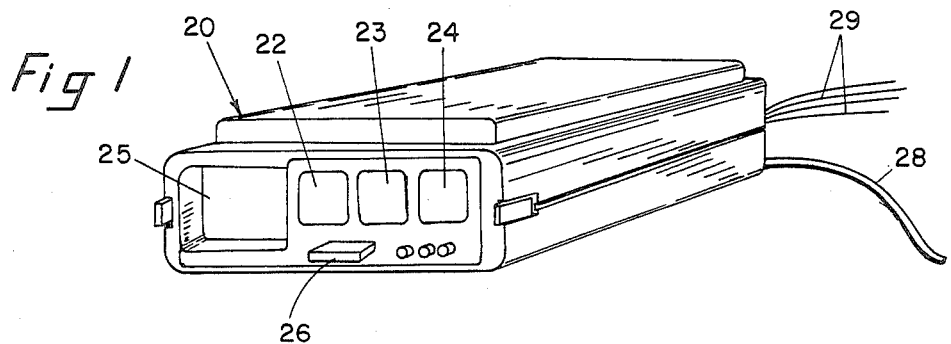
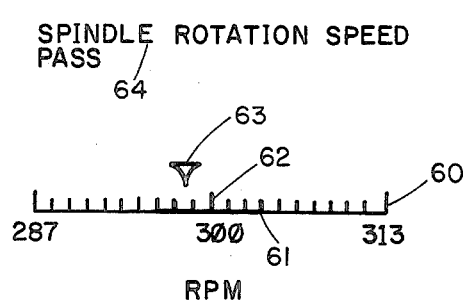
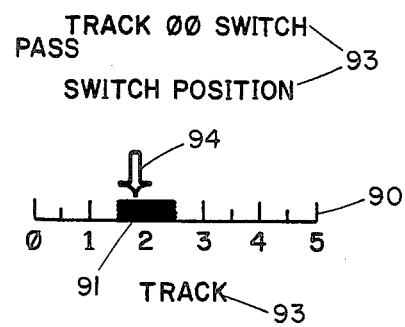
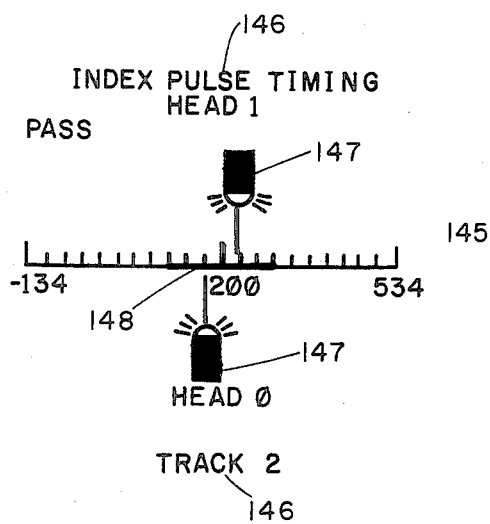
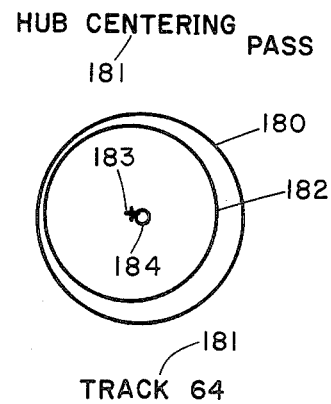

DISK DRIVE TESTING METHOD AND APPARATUS

FIELD OF THE INVENTION

This invention pertains generally to the field of peripheral equipment for computers and particularly to testing apparatus for disk drives of the type used in microcomputer systems.

BACKGROUND OF THE INVENTION

Small floppy disk drive units are in common use today in microcomputer systems sold for both business and personal use. Because the disk drives are complex electromechanical devices which must perform with precision positioning and timing to achieve reliable operation, the disk drives often are the least reliable component of the computer system. Consequently, original equipment manufacturers (OEMs) of computer systems routinely perform receiving inspection tests on purchased disk drives to verify the quality and compatibility of the drive units. The incoming inspection procedure may also include adjustments to specifications more stringent than those advertised by the disk drive manufacturer. In addition to the testing and adjustment of disk drives by manufacturers, the servicing of existing disk drives also requires checking of performance criteria and adjustments of the unit where possible to meet specifications.

The testing systems presently used on disk drives may be classified into three general categories: exercisers, testers, and analyzers.

Exercisers are the most basic type of test equipment and usually simply provide the operator with switches by which the disk drive can be controlled, for example, by turning the motor on and off, selecting a track, reading, writing, etc. Much experience and skill is required on the part of the operator to properly perform the inspection and adjustment of the drives using this type of equipment.

Drive testers provide somewhat greater automation of the test procedure by using a controller which controls the operation of the drive unit in the proper manner for each test. The operator must still enter relevant test information (e.g., track number, type of data to write, test to perform, etc.). The actual analysis of the test results and the comparison of the results to the drive specifications is not done automatically. These testers spare the operator from the basic task of controlling the disk drive unit but the actual measurements and decisions as to the satisfactory performance of the drive must still be made by the operator.

Disk drive analyzers provide more completely automated drive measurement systems, and are capable of complete disk drive testing without additional equipment and with a high degree of automation. Some existing analyzers require the operator to select tests while others will automatically find the shortest testing procedure for a given situation. Such equipment is generally capable of automatically comparing the drive specifications to the measured results and indicating to the operator whether the test has been passed or failed.

While existing disk drive analyzers provide substantial automation of many disk drive test procedures, they are generally limited in the manner in which test results are communicated to the operator. Many tests results are reported to the operator in the form of a pass-fail indication or alphanumeric data, which gives little direct information to the operator as to how close the machine is to the specification boundary between acceptable and unacceptable performance. In particular, where the operator must adjust the drive to bring it into specification, the operator may have difficulty gauging the effect of his adjustments from the alphanumeric data displayed to him. Other analog tests of the drive's mechanical movement and timing result in an oscilloscope wave form being presented to the operator which must be analyzed by him, thus making such tests prone to operator errors.

SUMMARY OF THE INVENTION

The disk drive testing apparatus of the present invention is capable of automatically cycling through the main types of disk drive tests, including analog tests, digital tests, window margin testing and mechanical exercising. The apparatus can be operated by an operator with relatively little experience or skill, and the results of the tests are displayed to the operator in a fashion which aids the operator in determining whether the disk drive is performing acceptably and in adjusting the drive as necessary to bring it within specifications.

In particular, the apparatus provides a graphical display to the operator, as on a cathode ray tube screen, in a manner which allows the operator to determine easily whether the disk drive is performing in or out of specification, to determine how "far" in or out of specification the drive is, and to enable the operator to readily gauge the effect of his adjustments, greatly simplifying adjustments and allowing them to be made more quickly and accurately. Specifications for each disk drive manufacturer's product can be read into the apparatus with a memory module, such as a plug-in EEPROM, or the plug-in memory can be reprogrammed by the user to allow customized specifications. Window margin tests providing statistical predictions of the long-term data stability of the disk drive are performed and the results displayed to the operator in a manner which allows him to assess the probability of data reading and writing errors from the drive over a long period of time.

Information concerning the performance of the disk drive is provided to the operator by displaying a graphics field which defines a performance reference frame including a geometric target specification position, a geometric pass range, and a geometric fail range. The geometric reference range may be one dimensional, as a linear scale, or two dimensional, as a shaded region, defining a pass area and a fail area. A figure is then displayed which is superimposed on the graphics field and is displaced geometrically from the target specification position by a distance which is directly related to a performance variable. The performance variable is determined by comparing a signal from the disk drive which is affected by the performance condition of the drive being tested with a specification reference and calculating the performance variable in direct relation to the deviation of the disk drive signal from the reference.

The graphics field for each particular test and the relationship of the superimposed figure to that graphics field is selected to provide a recognizable analog of the physical parameter of the disk drive being measured. For such tests as spindle rotation speed, track 00 switch, index pulse timing, and radial head alignment, in which the physical variable being measured is one-dimensional (i.e., varies only at magnitude) and can be visualized by the operator as linear displacement in space, the graphics field chosen is a linear scale and the displacement of a cursor figure along the linear scale provides the analogy to the variation of the physical variable. For other tests, such as the centering of the disk on the hub, the physical variable is essentially two-dimensional, having both a magnitude and a direction, and the graphics field chosen is thus two-dimensional, defining pass and fail areas, with the displacement of the figure with respect to the graphics field being at a magnitude and in a direction from the specification position which is an analog of the magnitude and direction displacement of the physical variable from its desired specification state. The graphics field may appropriately simulate some physical structure on the disk or the disk drive, and the figure may simulate a mechanical position of another physical structure with respect thereto, thereby greatly facilitating comprehension by the operator of the relative physical relationship of the parts. Such a display is particularly advantageous in allowing the operator to gauge the way in which these parts "move" with respect to each other as adjustments are made on the disk drive by him, thereby speeding up adjustments and minimizing the effort of the operator in interpreting the test data that is being reported by the tester. An optional engineering display of the parameter being measured is also available. This display provides the viewer with the numerical value of the parameter (e.g., amplitude or time information).

Further objects, features, and advantages of the invention will be apparent from the following detailed description when taken in conjunction with the accompanying drawings.

BRIEF DESCRIPTION OF THE DRAWINGS

In the drawings:

FIG. 1 is an external perspective view of a disk drive tester in accordance with the invention.

FIG. 3 is an exemplary graphical display that would be seen by the operator on the display screen of the tester for a spindle rotation speed test.

FIG. 4 is an exemplary display for a track 00 switch position test.

FIG. 5 is an exemplary display for an index pulse timing test.

FIG. 6 is an exemplary display for a hub centering test.

DESCRIPTION OF THE PREFERRED EMBODIMENT

Figure 2:
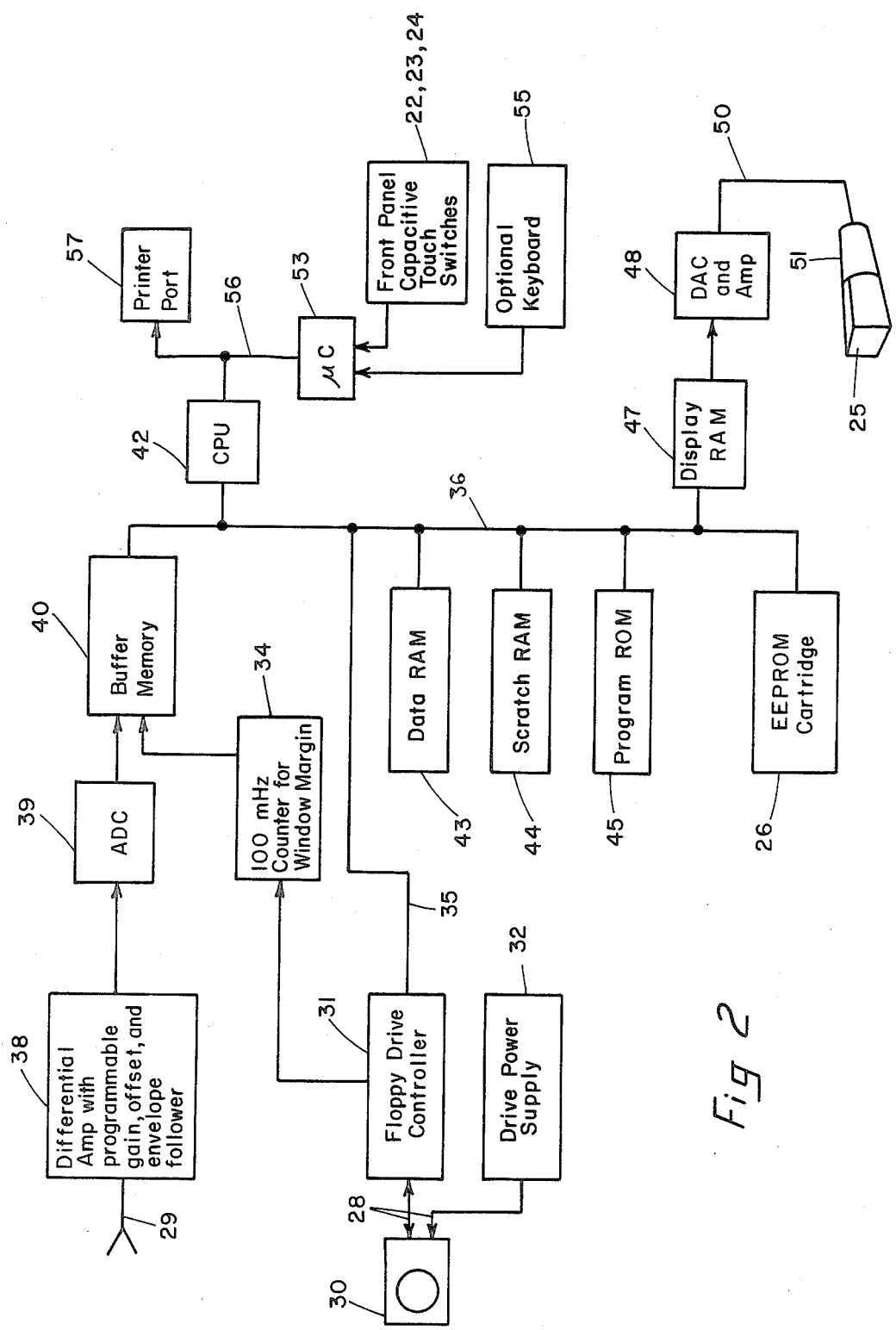
FIG. 2 is a schematic block diagram of the electronic components of the disk drive tester.

A disk drive tester in accordance with the present invention is shown generally at 20 in FIG. 1 positioned to take readings from a disk drive unit (not shown in FIG. 1). The apparatus 20 is designed for simplified test operations, having a front panel 21 which need include only three passive touch switches for TEST 22, PRINT 23, and RESTART 24. The front panel also includes a display screen 25, for example, a cathode ray tube, and a receptacle for an EEPROM (electronically erasable programmable read only memory) cartridge 26. To begin a test, the operator simply selects the proper EEPROM cartridge for the particular drive unit to be tested and pushes it into the receptacle. The operator initiates the test procedure by tapping the TEST switch 22, causing the tester 20 to automatically cycle through the test sequence specified in the EEPROM cartridge 26. Drive specifications which control the tester's pictorial displays may also be programmed into the cartridge 26. As each test is successfully completed, as explained below, the operator pushes the TEST switch to continue through the sequence. A hard copy printout of the test results on an auxiliary printer (not shown) can be requested at any time by the operator by pushing the PRINT switch. The third front panel switch for RESTART can be used by the operator to stop testing and begin the sequence over again. This restart switch would be used if the drive unit under test cannot be brought into specification and the operator decides to start testing another drive. Standard interface cabling 28 extends from the tester 20 to the drive unit to provide control signals to the drive unit and receive the output signals therefrom. Four probe clip lines 29 also extend from the tester and are attached to the drive unit under test. Two of the clips are attached to test points which connect to the read/write head amplifiers. The third clip attaches to the track 00 sensor test point and the fourth clip is grounded on the disk drive. The interface cabling 28 can also supply power to operate the drive units under test if desired.

A block diagram of the major electronic components of the tester 20 which control the disk drive unit 30 and the display on the screen 25 is shown in FIG. 2. The disk drive unit 30 receives operating control signals on the interface cable 28 from a standard floppy drive controller 31 (e.g., 8X300 series) and power from a power supply 32. The data received from the drive unit through the drive operating controller 31 is supplied to a 100 megahertz counter 34 which provides count timing for window margin tests, as described further below. The data output from the disk drive through the controller 31 is also provided on a line 35 to a main system bus 36. The analog signals from the probes are provided on the lines 29 to differential amplifiers 38 which have programmable gain and offset and an envelope follower. The outputs of the amplifiers 38 are provided to a 10 megahertz, 8 bit analog-to-digital converter 29 which provides its output signal to a buffer memory 40 having an 8 kilobyte capacity. The output data from the counter 34 is also supplied to the buffer memory 40, which in turn is connected to the system bus 36.

The system bus 36 is under the control of a central processing unit 42 (e.g., an 80186). Also connected to the system bus 36 is a random access memory 43 for data, a scratch pad random access memory 44, a program read only memory 45, and the EEPROM cartridge 26. Output data under the control of the CPU 42 is supplied on the bus 36 to a random access display memory 47 which provides its output to a digital-to-analog converter and amplifier 48. The amplified signals from the converter 48 are provided on control lines 50 to a cathode ray tube 51 for graphics display on the screen 25.

Also connected to the central processing unit 42 is an auxiliary microprocessor 53 which receives input from the front panel touch switches 22, 23, and 24 and an optional keyboard 55. The processors 42 and 53 are connected by a bus 56 which is also connected to a printer port 57 to which a hard copy printer may be connected.

A number of disk drive tests can be carried out utilizing the tester 20 of the present invention. These tests may be generally classified as analog tests, digital tests, mechanical exercising of the drive, and window margin tests. The following tests and associated procedures may be carried out utilizing the tester 20 to provide the operator with information necessary to adjust basic operational parameters of the disk drive unit, if possible, and to make pass-fail decisions where adjustments of the drive to specification are not possible.

A first test determines the spindle rotational speed and whether the speed is in or out of specification. Standard 5¼-inch disk drives rotate at 300 rpm and 8-inch disk drives rotate at 360 rpm. The tester 20 checks the rotational speed by timing the occurrence of the index pulses (approximately 200 milliseconds apart) received from a photodetector which senses light from a light source—on the opposite side of the diskette from the detector—which passes through a small hole punched in the diskette once every revolution of the diskette. If the motor speed is incorrect, the operator can adjust it by adjusting a potentiometer on the motor control circuit board of the disk drive. Generally, the rotational speed of the spindle must be within 1 percent to 1.5 percent of specification.

The graphics displayed to the operator on the screen 25 for spindle rotational speed is illustrated in FIG. 3, and includes a field reference frame 60 composed of a straight horizontal line with linear scale markings thereon and an inner "pass range" scale 61 centered about the nominal specified speed, e.g., 300 rpm, at a central position 62. A moving cursor figure. 63, in the form of a triangularly shaped pointer, is superimposed on the graphics field and is capable of moving left or right above the scale 60 as the motor speed decreases or increases. The speed of motion of the pointer figure 63 with respect to the scale 60 allows the operator to gauge how fast the motor speed is coming into specification as he adjusts it, and allows him to minimize time spent in adjusting speed due to unintended overshoots or undershoots of the nominal specification speed.

Figure 12:
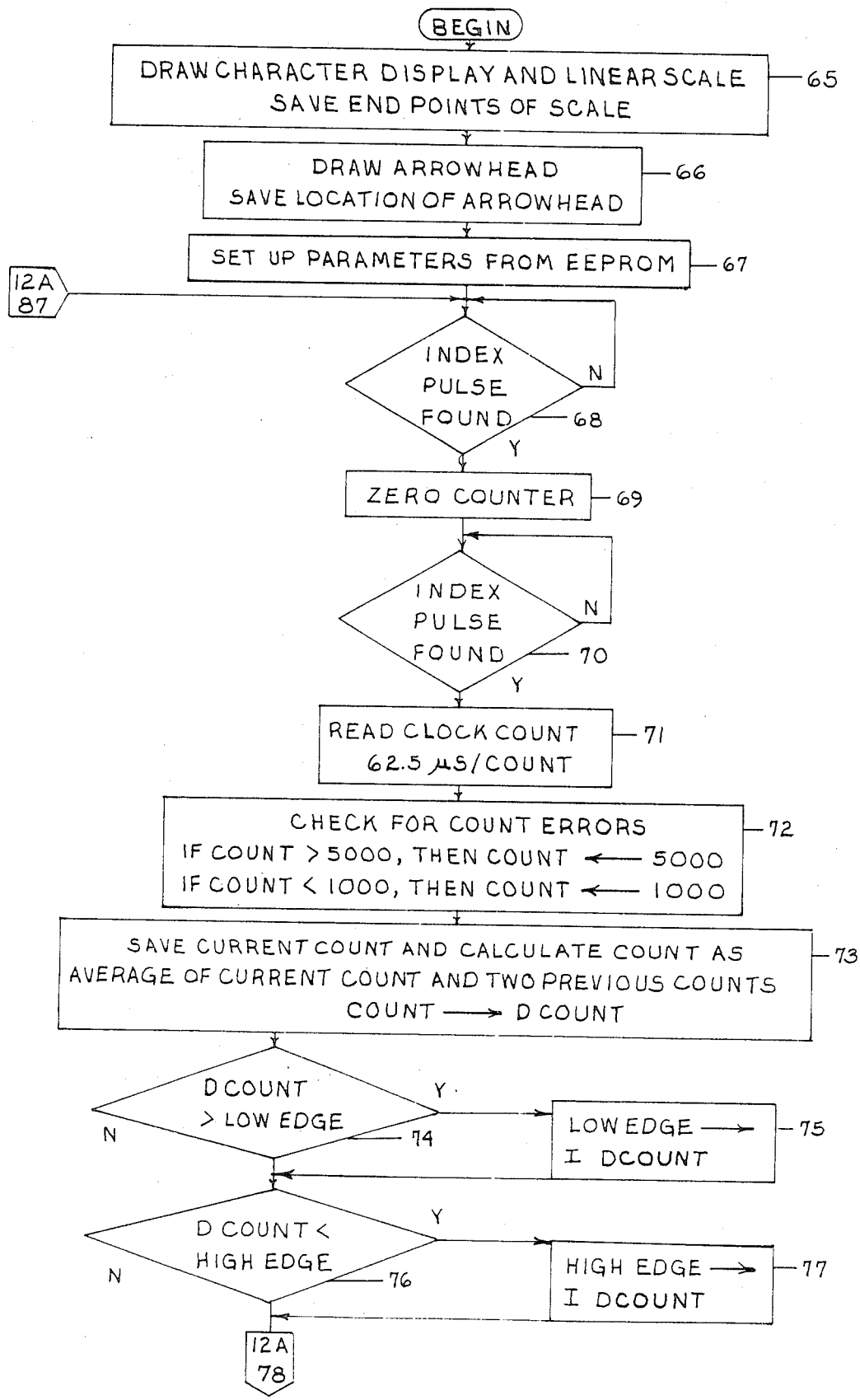
FIGS. 12–22 are computer program flow charts showing the operation of the program within the apparatus of the invention for carrying out the various disk drive tests.
Figure 12A:
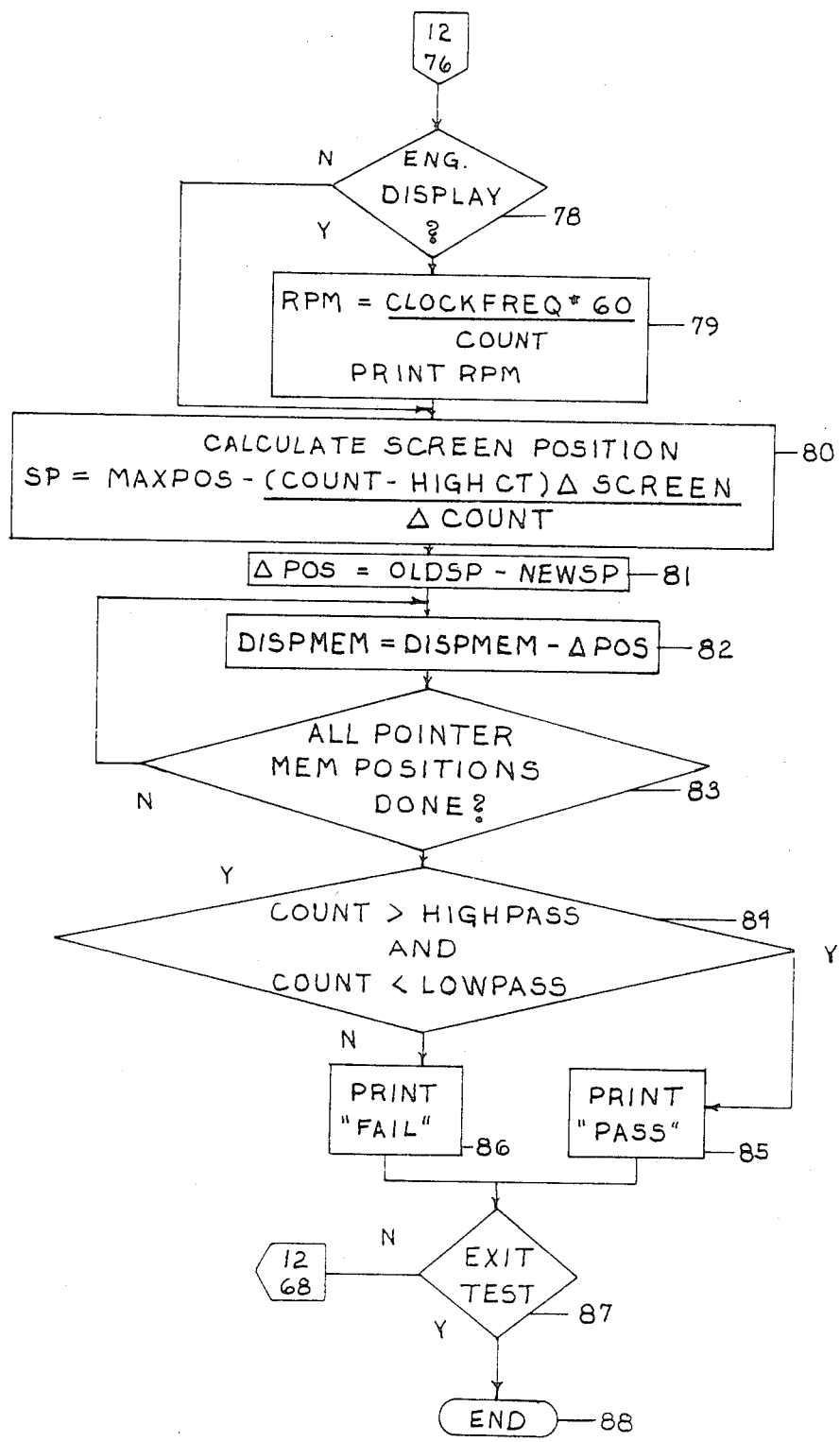

The program by which the processors 42 and 53 control the test and display of information for the spindle rotation speed test is illustrated in the flow chart of FIG. 12. When the test sequence is entered after the operator has pushed the TEST switch 22, the program draws the alphanumeric characters 64 and the linear scale 60 and saves the end points of the scale (block 65), draws the arrowhead or pointer 63, and saves the initial location of the pointer in display memory (block 66), and then inputs the specification parameters (rotation speed and acceptable speed pass band limits) from the EEPROM into memory (block 67). The program then cycles until an index pulse is found (block 68); when a pulse is found, the counter is zeroed (block 69), then started and the program cycles until the next index pulse is found, at which time the counter is stopped and the clock count from the counter 34 is read (block 71).

The count is then checked for errors (block 72). If the count equals 5,000, for a clock counter having 62.5 microseconds per count, then the count is set to 5,000. Conversely, if the count is under 1,000, then the count is set to 1,000.

The program then saves the current count and calculates the count variable as the average of the current count and the two previous counts, the new variable DCOUNT (block 73). If DCOUNT is greater than a low edge count (block 74), indicative of a fast spindle speed above the ends of the scale 60, the low edge number is substituted for DCOUNT (block 75). Similarly, if DCOUNT is less than a high edge number (block 76), indicative of a spindle speed below the end of the scale, the high edge number is substituted for DCOUNT (block 77).

The program then checks to see if the optional engineering display information is requested (block 78); if so, RPM is calculated as the clock frequency divided by the COUNT times 60, and the RPM number is printed (block 79). The program then calculates the screen position SP for the pointer (block 80) to convert the count to a screen pixel position for the pointer. MAXPOS is the maximum screen position, Δscreen is the difference between the maximum screen position and the minimum screen position in pixels, and Δcount is the difference between the maximum count allowed at one end of the scale and the minimum count allowed at the other end of the scale. A change in screen position is then calculated as the difference between the prior screen position and the new screen position SP just calculated (block 81). The content of the display memory 47 for the pointer 63 is then updated by substituting in display memory the old display memory data minus the change in position just calcuated (block 82). The program then checks to determine if all pointer memory positions are updated (block 83) and cycles until all locations are done. As the content of the display memory 47 is continuously used to control the graphics on the CRT screen 25, the updating of the display memory will result in an appropriate change in position of the cursor figure 63. The count is then compared with HIGHPASS and LOWPASS counts which are the counts which would occur at the edges of the pass band 61 (block 84); if the count is within the band, the program prints or displays "pass" (block 85); if not, "fail" is printed or displayed (block 86). The program then determines if the TEST switch 22 has been pushed by the operator (block 87); if so, the test sequence ends (block 88); if not, the program cycles back up to the position of the block 68 to wait for the next index pulse.

Another test carried out by the tester 20 is determination of the track 00 sensor position and stop adjustment. Track 00 is the outermost track on a diskette. An optical switch in the disk drive senses the position of the head and stops the sensor motor as the head moves out to track 00, which essentially becomes the reference point for radial head motion. A disk controller when first turned on will step the head out to track 00 so that it is starting at a known position. The controller keeps a running count of subsequent steps to determine head position. If the controller encounters a mismatch between the recorded sector identification field and counted track number, it will set an error flag in its registers restart. As the head passes the track 00 sensor switch, the switch changes state. Generally, manufacturer's specifications provide that the track 00 sensor should change state as the head moves outwardly toward or inwardly from track 02.

The display presented on the graphic screen 25 to the operator during the track 00 switch test is illustrated in FIG. 4, and includes a graphics display composed of a linear reference scale 90 with reference indicia underneath which identify several of the outermost tracks beginning with track 00, a "pass band" stripe 91 on the scale 90 centered at the position of track 02, and character displays 93 identifying the test being conducted, the track numbers under the reference scale, and the significance of the position of the moving cursor figure 94 which moves left and right with respect to the scale 90 depending on the sensed position of the track 00 switch. If the cursor figure 94 is positioned over the pass band 91, the track 00 switch is considered to be within specification.

Figure 13:
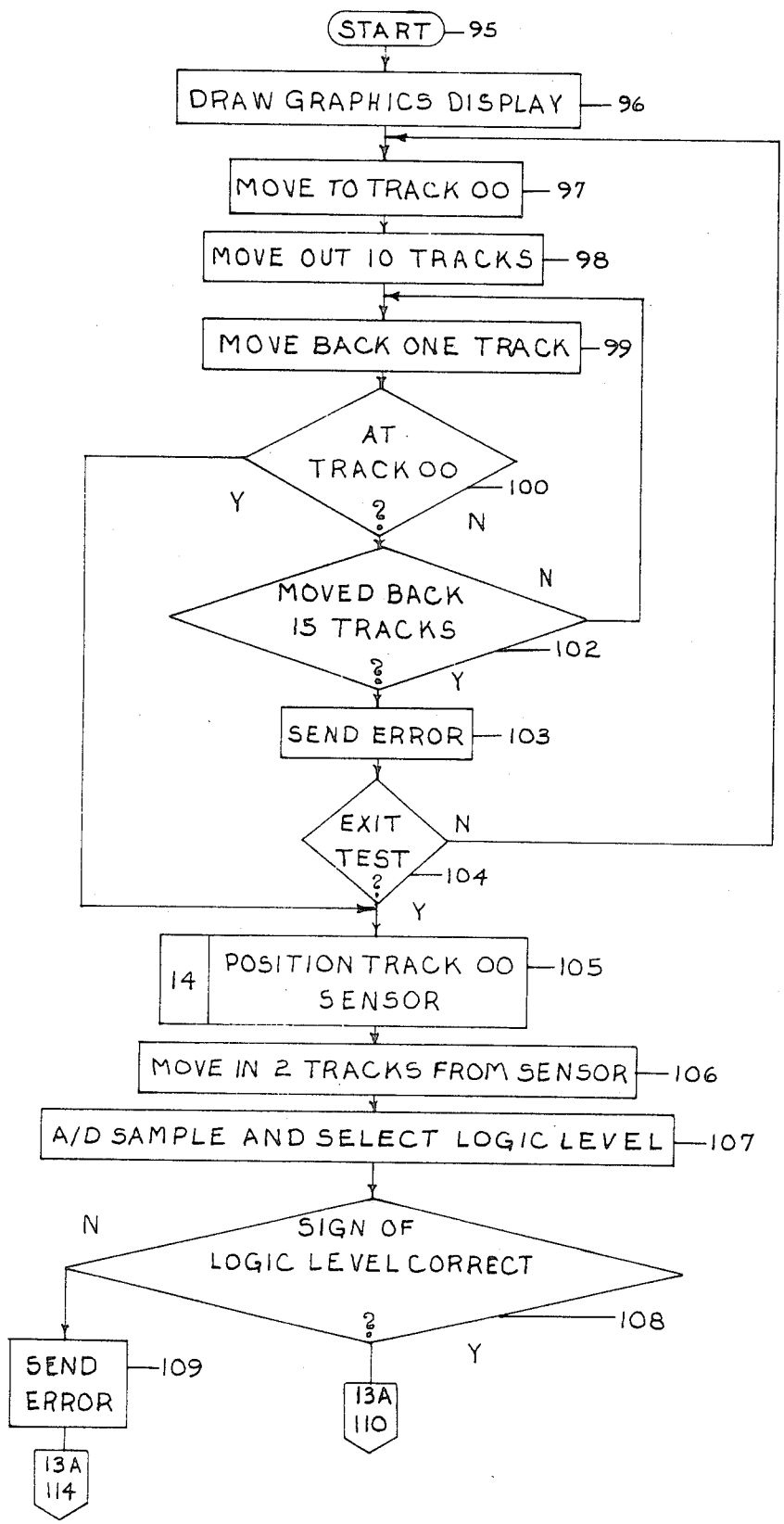
Figure 13A:
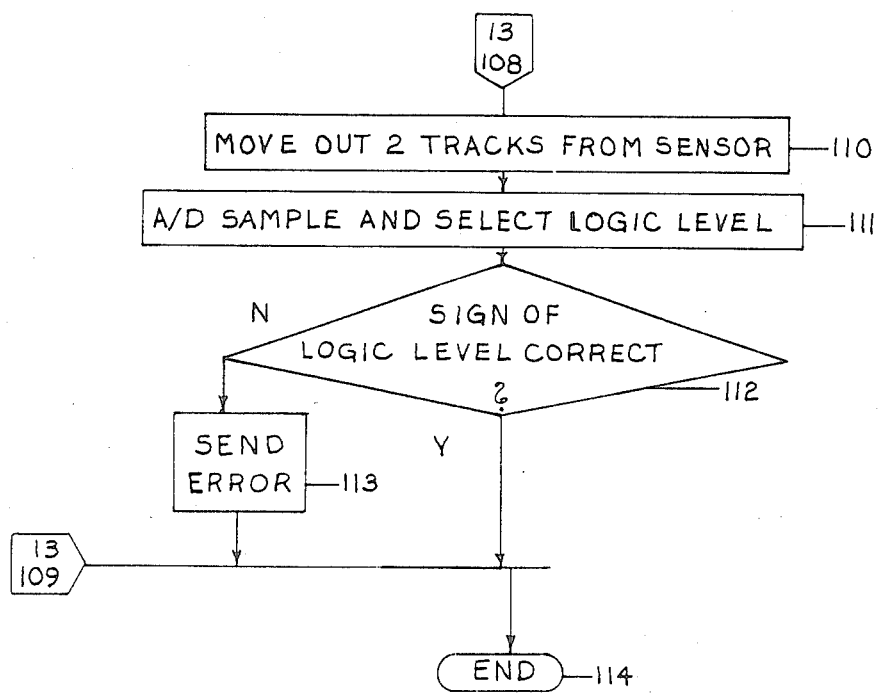
Figure 14:
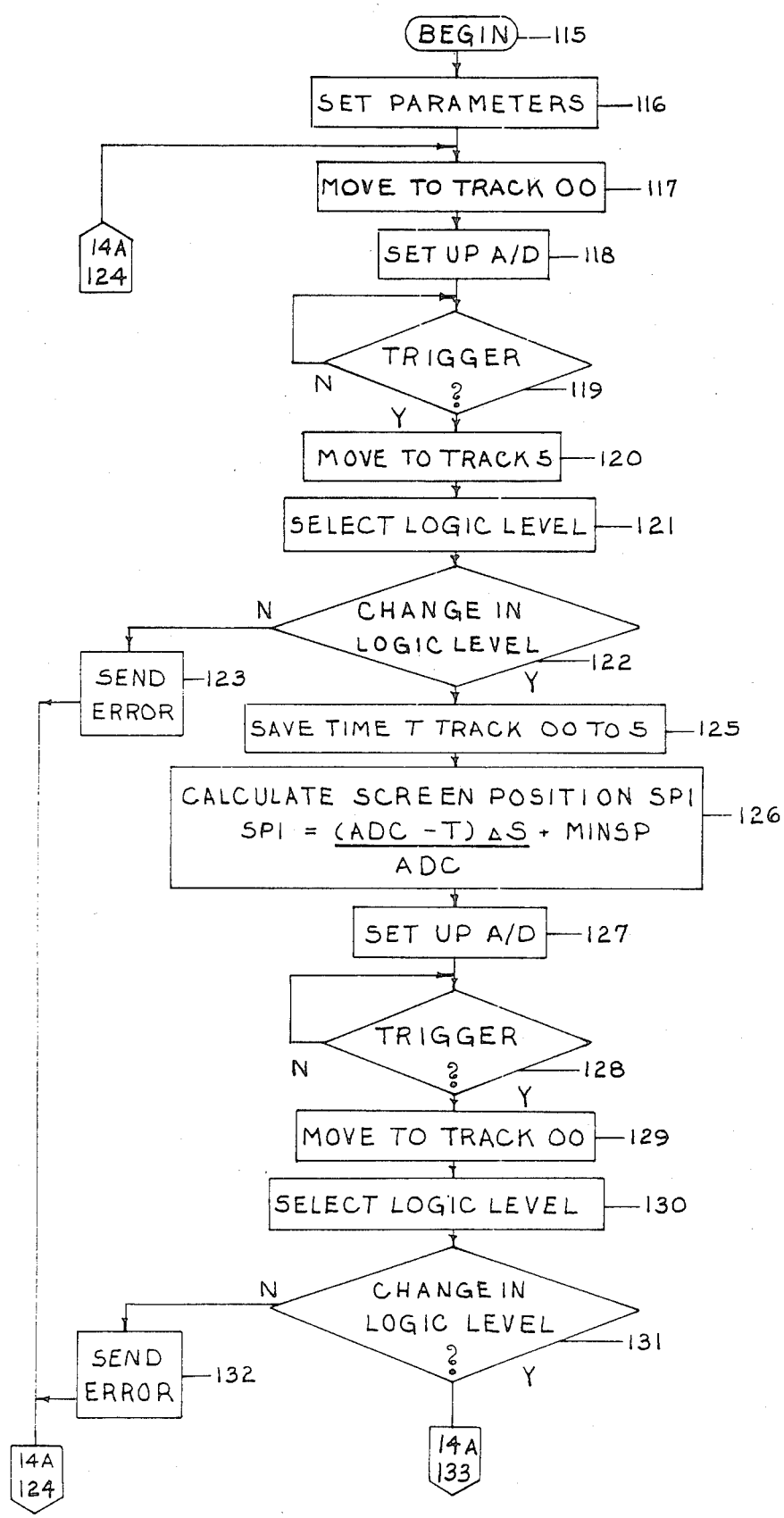
Figure 14A:
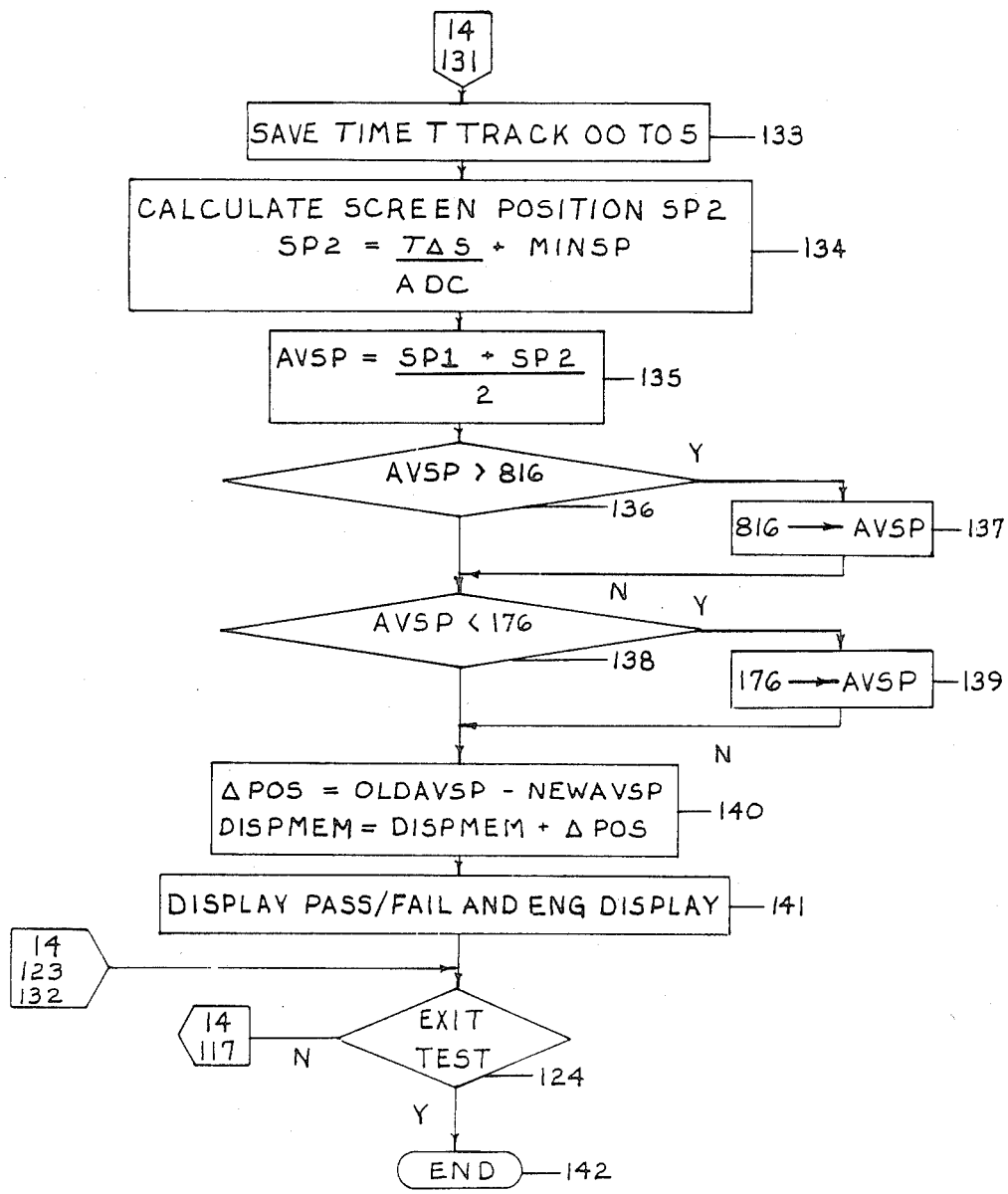

The operation of the program by which the track 00 switch is positioned and the results displayed is illustrated in the flow charts of FIGS. 13 and 14. Upon start of the test (95), the graphics are first drawn along with the characters (block 96), and the head is moved to the track 00 recorded on the test disk (97). The program then instructs the drive to move the head out ten tracks (98), which brings the head past the track 00 sensor. The head is then moved back one track (99) and a check is made to see if the head is at track 00 (100). If not, a count is made of the number of tracks that the head has been backed off and if it has not yet moved back fifteen tracks (102), the program cycles back up to block 99 and moves the head back one more track. If, after the head has been moved back fifteen tracks the track 00 still has not been found, an error is sent (103) and the program returns to block 97 and cycles until the operator pushes the TEST switch again to exit the test (block 104). If track 00 is found or if the exit test button is pushed, the program then goes on to subroutine 105 which positions the track 00 sensor. This subroutine is illustrated in FIG. 14. After the track 00 sensor has been positioned, the head is moved in two tracks from the sensor (106), and the output from the track 00 sensor is provided to one output data line of the A/D converter 39 and the logic level which is indicative of the state of the sensor switch is determined (107). If the sign of the logic level is not correct (block 108), indicating that the switch has changed levels incorrectly given the manufacturer's convention, an error is sent (109). If the sign of the logic level is correct, the head is moved out two tracks from the track 00 sensor (110), the signal from the sensor is provided to the significant converter output line (111) and the sign of the logic level on the line tested to see if it is correct (112). The logic level at this time should be opposite the logic level checked above at 108. If the logic level is not correct, an error is sent (block 113). After sending of the error messages to the display screen at 109 or 113 or a determination that the logic level is correct, the test is ended (block 114).

The routine for determining track 00 sensor position 105 is illustrated in the flow chart of FIG. 14. After the beginning of the routine (115), the program sets the specification parameters from the EEPROM (track position of the track 00 sensor) (116) and moves to track 00 (117). The A to D converter is set up (50 microseconds per point) (118) and the program waits for a trigger (119). The head is then moved to track 05 (120) and the logic level of the signal coming from the A to D converter is selected (121) and the logic level is monitored to determine if it changes during the motion of the head (122). If not, an error signal is sent (103). If the logic level does change, the time T (or, equivalently, counts) to reach the position of the switch change from the start of motion of the head from track 00 to track 05 is saved (block 125). The screen position SP of the change is then calculated as shown in block 126 where ADC is the total count or time to move 5 tracks (typically 25 msec), T is the time to the change in sensor output, ΔS is the number of screen pixels across the scale 90, and MINSP is the minimum screen position of the scale. The A to D converter is then set again (127), there is a wait until it triggers (128), and the head is then moved from track 5 to track 00 (129). The logic level of the converted signal is selected (130) and checked (131) to see if there is a change in the logic level as the head moves from track 05 to track 00. If not, an error is sent (132) and the program checks to see if the exit test switch has been pushed (124). If there is a change in the logic level, the time T or counts to the change is saved (133). The screen position SP2 of the change is then calculated as shown in block 134. The average screen position AVSP is then calculated as (SP1+SP2/2(block 135) and the average so calculated is compared with a maximum pixel value for the screen (block 136), e.g., 816. If the average screen position is above 816, the screen position is substituted with the maximum limit 816 (137). If the average screen position is lower than some lower limit (block 138), for example 176, the average screen position is substituted with the numeric lower limit (block 139). The change in screen position ΔPOS then is calculated as the old average screen position minus the new average screen position. The display position loaded into the display memory 47 for the cursor figure is the original display memory plus the change in screen position so calculated (140). The average screen position is then compared with the pass-/fail criteria and a pass/fail and engineering display (time from initial head movement to switch output change, if desired) are provided on the screen (141) after which a check is made for the exit test (block 124). If the TEST switch has not been pushed, no exit test, the program cycles back to block 117 to move to the track 00 sensor and repeat the test. If the exit test switch has been pushed, the test is ended (142).

A further test is the timing of the index pulse. The index pulse is received from a photodetector which is triggered by light from a source which passes through a small hole punched in the diskette. The pulse from the photodetector is used by the disk controller to establish the start of sector formats on the diskette. The standard alignment diskette has a pulse written thereon beginning at a specific time interval after the index hole passes the photodetector. Standard specifications for the time delay are fairly, loose, generally 200 microseconds plus or minus 100 microseconds. The position of the photodetector must be adjusted if the timing is out of specification.

The display shown to the operator for the index pulse timing test is illustrated in FIG. 5 and includes a linear graphics reference scale 145, a character display 146 including a description of the index pulse timing test, the track on which data is being read from the alignment disk, and an indication above and below the scale 145 of which head is being referenced to the scale above and below the scale where a two head disk drive is tested. Cursor positioning figure 147 representing the two heads move left and right on the scale 145 in direct proportion to the time difference between the index pulse and the start of data read by each head. A central portion or pass band 148 of the scale is centered about the desired 200 microsecond timing position and indicates the pass band of plus or minus 100 microseconds from the reference position. The graphics display of FIG. 5 is particularly advantageous in testing two head disk drives since an adjustment of the index pulse sensor may bring one head closer to the ideal specification position but drive the other head farther away since the two heads are not generally precisely aligned with one another. The display of FIG. 5 readily allows the operator to adjust the index pulse timing so that both heads are within the pass band 148, if possible, and deviate from the nominal timing position by an equal amount. Such adjustments with two head drives often require difficult judgments on the part of the operator if he is simply reading numeric data from the two heads indicating the index pulse timing for each head.

Figure 15:
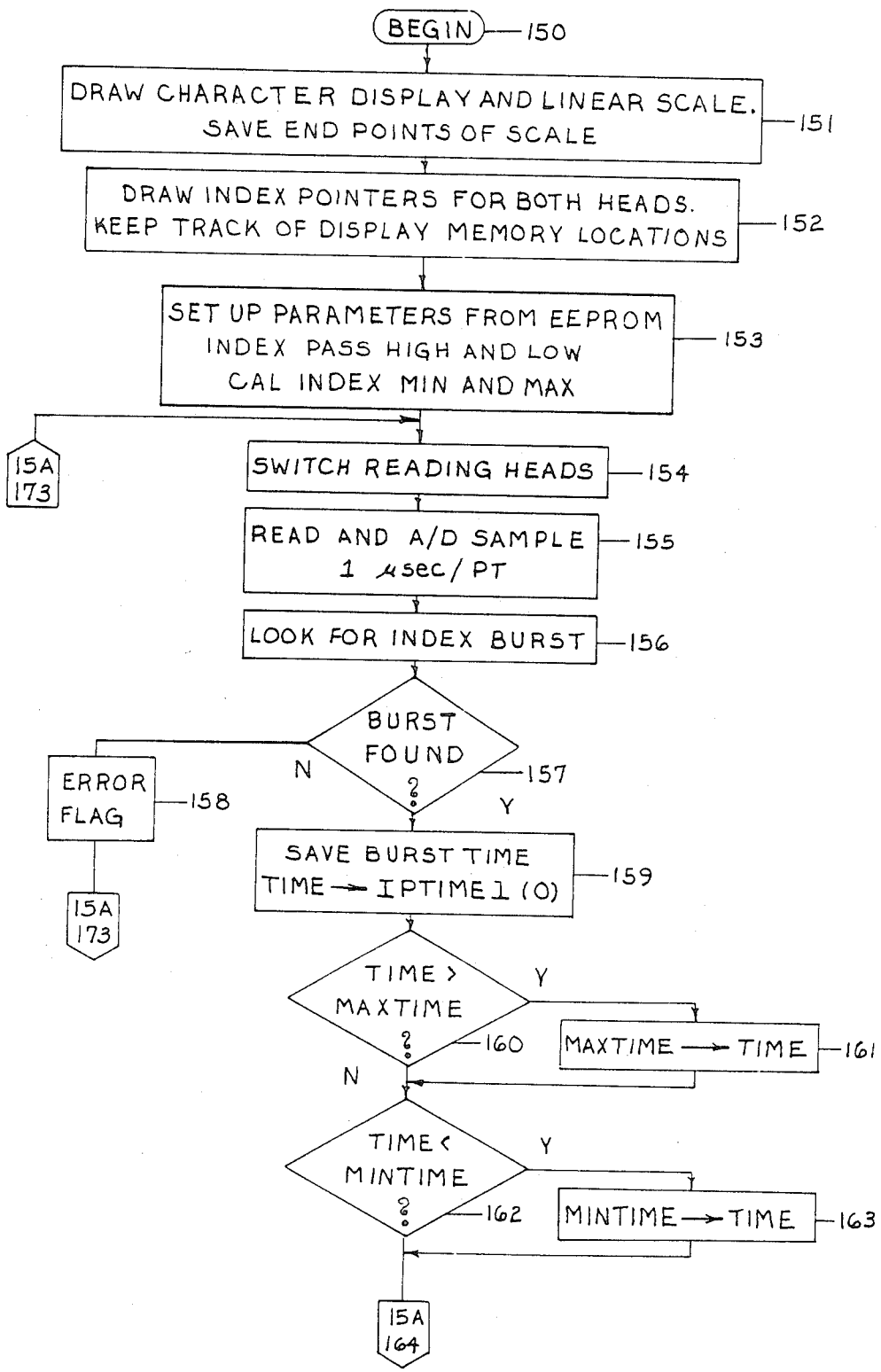
Figure 15A:
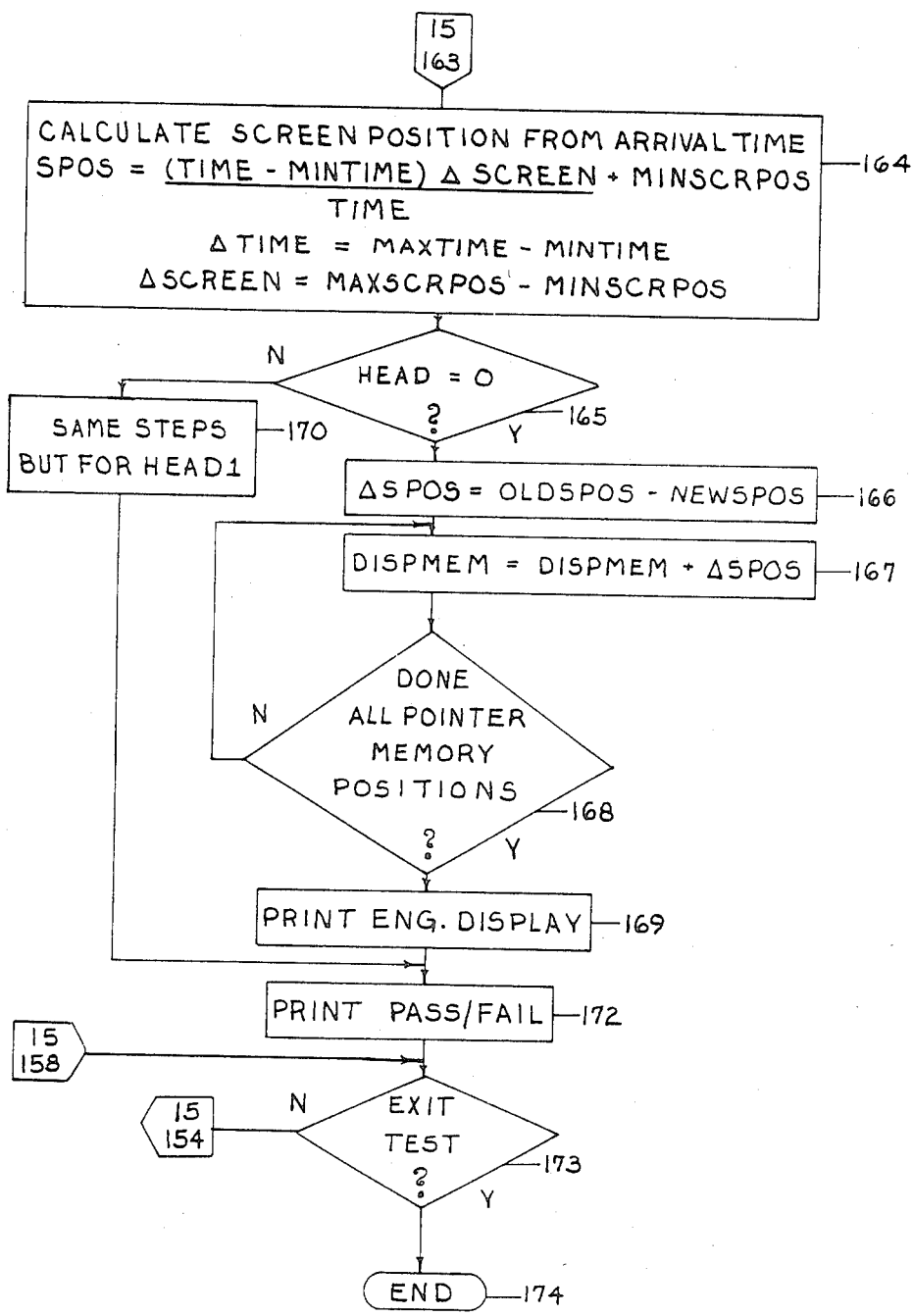

The flowchart of the program operations for the index pulse timing test is illustrated in FIG. 15. After the test begins (150) the character displays 147 and linear scale 145 are drawn (151) and the index pointer figures 147 are then drawn for both heads at a selected initial position which is maintained in the display memory (152). The specification parameters are then read in from the EEPROM, including the index pulse time delay high and low for the pass band 148 times for the index pulse are calculated (block 153). The head which is reading data is then switched (block 154), starting with head 0, and the A to D converter is turned on and a sample read at one microsecond per point (block 155). The index pulse triggers the A to D converter 39 which is connected to receive the signal from the particular head which is reading data from the rotating disk. The output of the analog-to-digital converter is monitored to look for the index burst data (block 156). If the burst is not found (block 157) an error flag is set (158); if the burst is found, the burst time (time between index pulse and burst) is saved and stored as a variable IPTIME 1 (block 159). The burst time is then checked to determine whether it is greater than the maximum time as specified from the EEPROM (160); if so, the maximum time specification MAXTIME is substituted for the variable TIME (block 161). The program then checks to determine if the time variable is less than the minimum time specification MINTIME from the EEPROM (block 162); if so, the minimum time specification is substituted for the variable TIME (163).

The screen position SPOS of the index pointer figure 147 for each head is then calculated as shown in block 164 where MAXSCRPOS and MINSCRPOS are the screen positions at the top and bottom of the scale 145. The program then determines if head 0 is being read (165); if so, the change in screen position is then calculated as the old screen position minus the new screen position (block 166), and each picture element to be drawn on the screen which is stored in display memory 47 is updated by substituting the old display memory plus the change in screen position for the display memory (block 167), and the program recycles until all pointer memory positions have been done (block 168). As in the program flow charts described above, these program memory positions are supplied through the digital-to-analog converter 48 and amplifier to control the CRT display 51. If desired, the actual pulse timing in microseconds may be printed for an engineering display (169). If at block 165 it is determined that head 1 is being read, the same steps are performed (block 170) as in blocks 166, 167, 168 and 169, but for head 1.

The index pulse timing for each head is compared with the index pass high and low times and a pass or fail character 146 is displayed on the screen to indicate whether the head has passed or failed the maximum boundary test (172). The program then checks to see if the TEST switch has been pushed (173) indicating that the test is to be exited. If not, the program recycles back up to block 154 to switch the reading head to now take data for the opposite head. This process continues, switching back and forth between the heads, until the TEST button is pushed, at which point the test is ended (174) and another test procedure is entered.

A basic test required for disk drives is the ability of the drive unit to properly center the diskette on the hub or drive spindle. The hub centering test measures the ability of the spindle to correctly align with the diskette center hole. Offcenter clamping of the diskette can result in total loss of stored data since an eccentrically recorded track cannot be located after the diskette is removed from and then reinserted into the drive or another drive. The procedure followed by the tester 20 utilizes a test disk having a signal written on it at a concentric position with respect to the hole in the disk. Assuming that the signal written on the disk is of constant amplitude, a difference in the amplitude of the signal as read by the head over one revolution of the diskette will be related to the eccentricity of the diskette as it rotates.

The graphics display provided to the operator on the screen 25 for the hub centering test is illustrated in FIG. 6, in which an outer, larger circle 180 defines the outer perimeter of the area of acceptable centering, and characters 181 are drawn on the screen to indicate the test being conducted and the track on the diskette which is being read. The graphical reference frame 180 is generally a simplified geometric analogy of the diskette itself or the inner circular hole in the diskette. The relative position of the spindle with respect to the hole in the diskette is represented by an inner circular figure 182 having a central point 183 represented by a cross, while the center position of the reference circle 180 is represented by a small circle 184. The displacement of the inner circular figure 182 from perfect concentricity with the outer boundary reference circle 180 is proportional to the eccentricity of the clamping of the diskette to the hub spindle. The graphics displays are so arranged that if the inner circle 182 touches the outer circle 180, a failure of the disk drive to meet the hub centering specifications is found.

Figure 16:
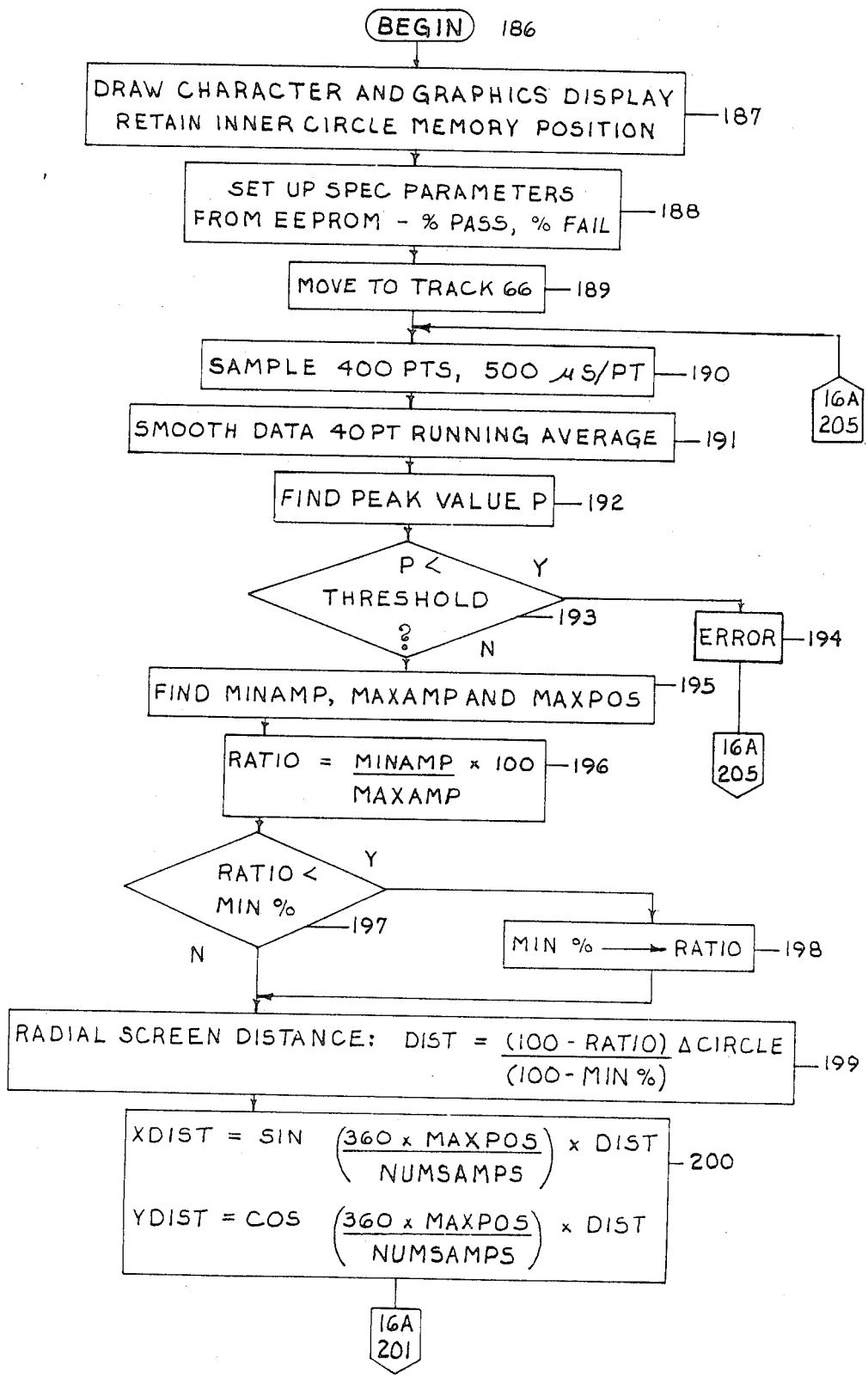
Figure 16A:
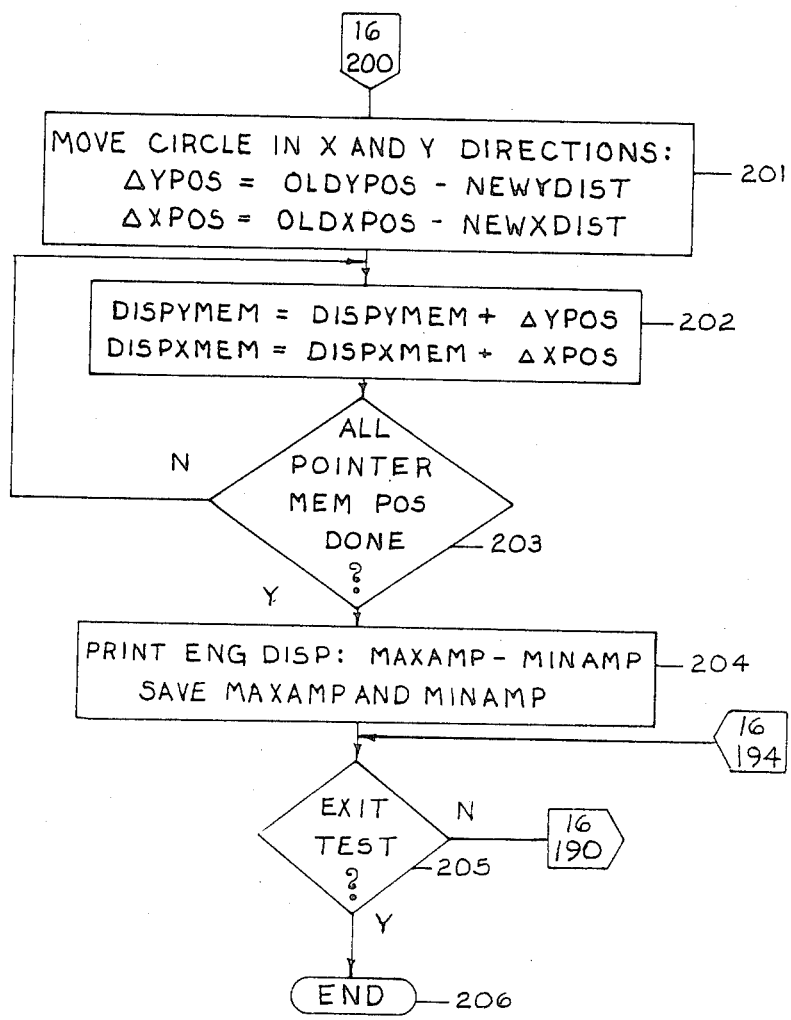

The program steps for the hub centering test are illustrated in the flow chart of FIG. 16. After beginning the test (186), the character and graphics display on the screen 25 are drawn and the initial inner circle memory position is retained since this position will be adjusted as actual hub centering data is acquired. The specific specification parameters from the EEPROM are then read in (block 188), including the percent deviation in signal amplitude due to eccentricity which will allow a pass to meet specification. The disk drive head is then commanded to move to a specific track (block 189), for example track 66, and the analog to digital converter is then operated to sample a selected number of points covering one revolution of the disk (190). The output data from the A to D converter is then smoothed by using a 40 point running average (191) and the peak value P of the sampled data is searched for and found (192). The peak value P is compared to a threshold (block 193) and if it is below the threshold an error message is reported (194) and the remaining test steps are bypassed. If the peak value P is above the threshold, the minimum amplitude (MINAMP) of the sample (which will cover one complete revolution of the disk), the maximum amplitude (MAXAMP), and the position of the maximum amplitude in the data array (MAXPOS) are determined (block 195). A percentage ratio is then calculated of the minimum to maximum amplitude (196) and that ratio compared with a minimum specified percentage (197). If the ratio is less than the minimum, the selected minimum is substituted for the RATIO variable (198). The radial screen distance DIST is then calculated as indicated at block 199 where ΔCIRCLE is the screen distance in number of pixels between the inner circle 182 and the outer circle 180 when they are perfectly centered. The displacement of the inner circle 182 from its central position is then calculated in two dimensions based on the position sample number MAXPOS at which the maximum amplitude was found. This sample position number MAXPOS can be utilized to determine the angular position at which the maximum is found by dividing it by the total number of sample points (NUMSAMPS), e.g., 400 points, and calculating the X distance XDIST and Y distance as shown in block 201.

The X displacement and Y displacement having been calculated, the circle is then moved in the X and Y directions by providing a change in Y position ΔYPOS and a change in X position ΔXPOS equal to the old position minus the new X and Y distances (block 201). The display memory is then updated by subsituting positions in display memory with the old display memory entry plus the change in X and Y positions for each of the X and Y display memory positions. The program cycles until all memory pointer positions are done (203) whereafter the engineering display is printed, including the maximum and minimum amplitude (204), and the program then proceeds to check for pressing of the TEST switch by the operator (block 205). If the button is not pushed, the program recycles to take another sample at block 190 and ends when the test switch is pushed (206).

The head resolution of a disk drive refers to how the signal amplitude read by the heads from the disk is affected by the data density. This can be tested by having each head read a track containing a signal recorded at a lower frequency (e.g., 62.5 KHz) and a second track read at twice that frequency (e.g., 125 KHz). Both signal patterns are generated by writing a low frequency signal to the first track and a high frequency signal to a second track by the disk drive being tested. Generally, manufacturer specifications require that the lower frequency amplitude read by the head not exceed the high frequency amplitude by more than a specified percentage.

Figure 7:
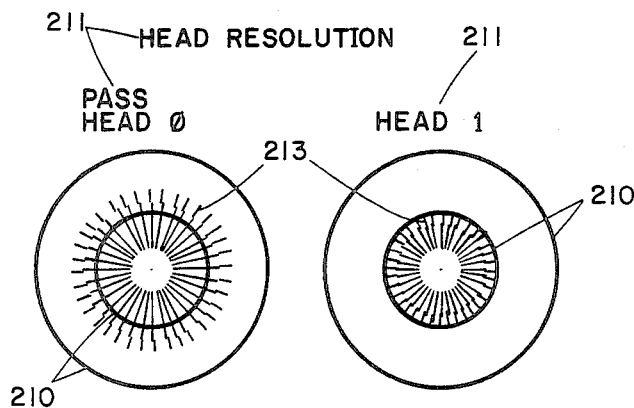
FIG. 7 is an exemplary display for a head resolution test.

The display provided to the operator by the tester 20 for the head resolution test is illustrated in FIG. 7. Individual reference frames 210 are provided for each of the heads. These reference frames consist of inner and outer concentric circles. Graphic characters 211 which advise the operator of the particular test being performed and identify which head each of the two reference frames pertains to are also displayed to the operator. The ratio of the amplitudes of the two frequences measured from the disk determines the size of a shaded circular band 213 within the outer circle. The band 213 is comprised of multiple circular patterns of dots. The area between the two inner and outer circles 210 is the pass band. As long as the shaded figure 213 extends out into the area between the two circles 210, head resolution is within specification. If the shaded area 213 withdraws within the inner one of the circles 210, or extends outside the outer circle, head resolution is outside of specification.

Figure 17:
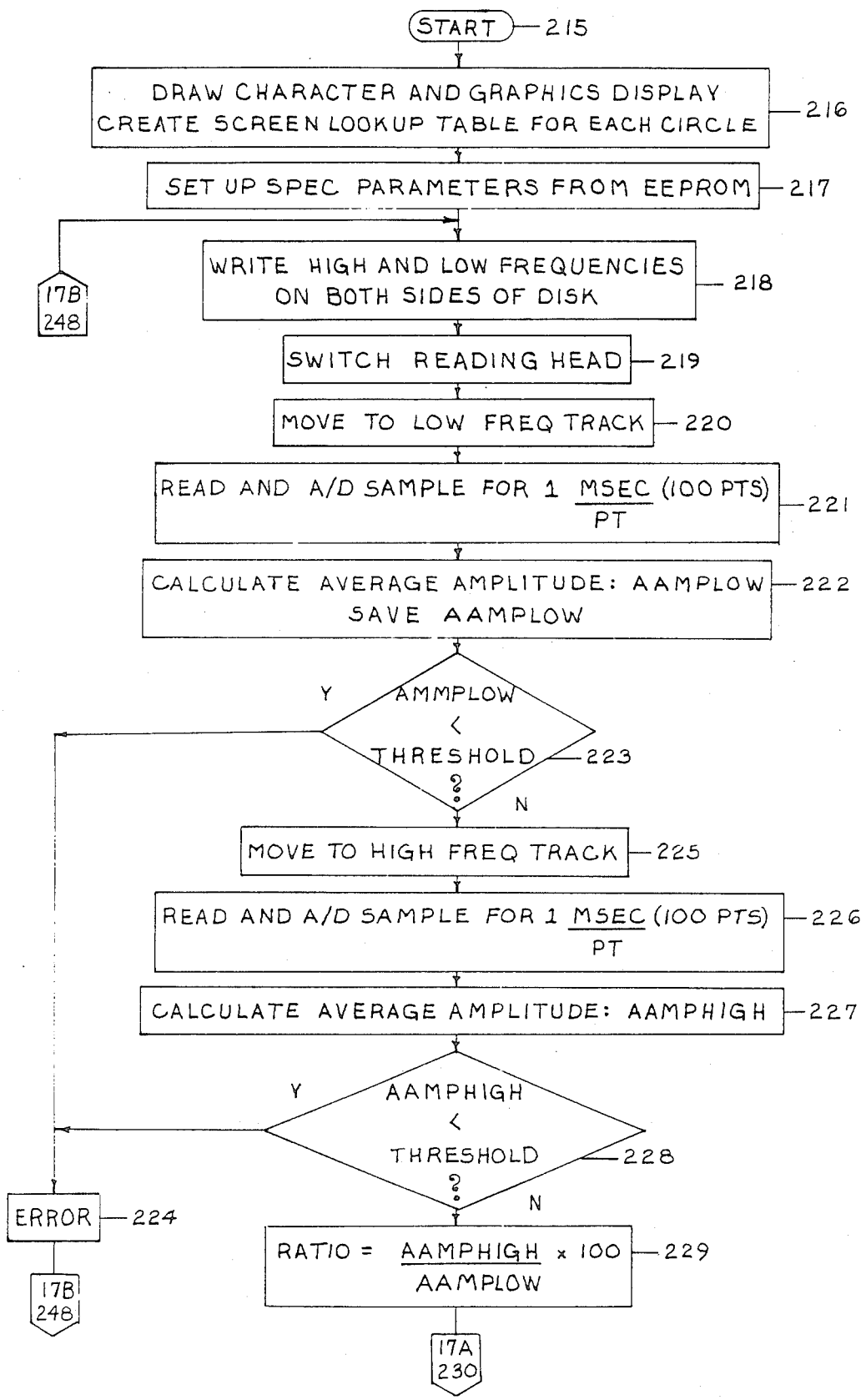
Figure 17A:
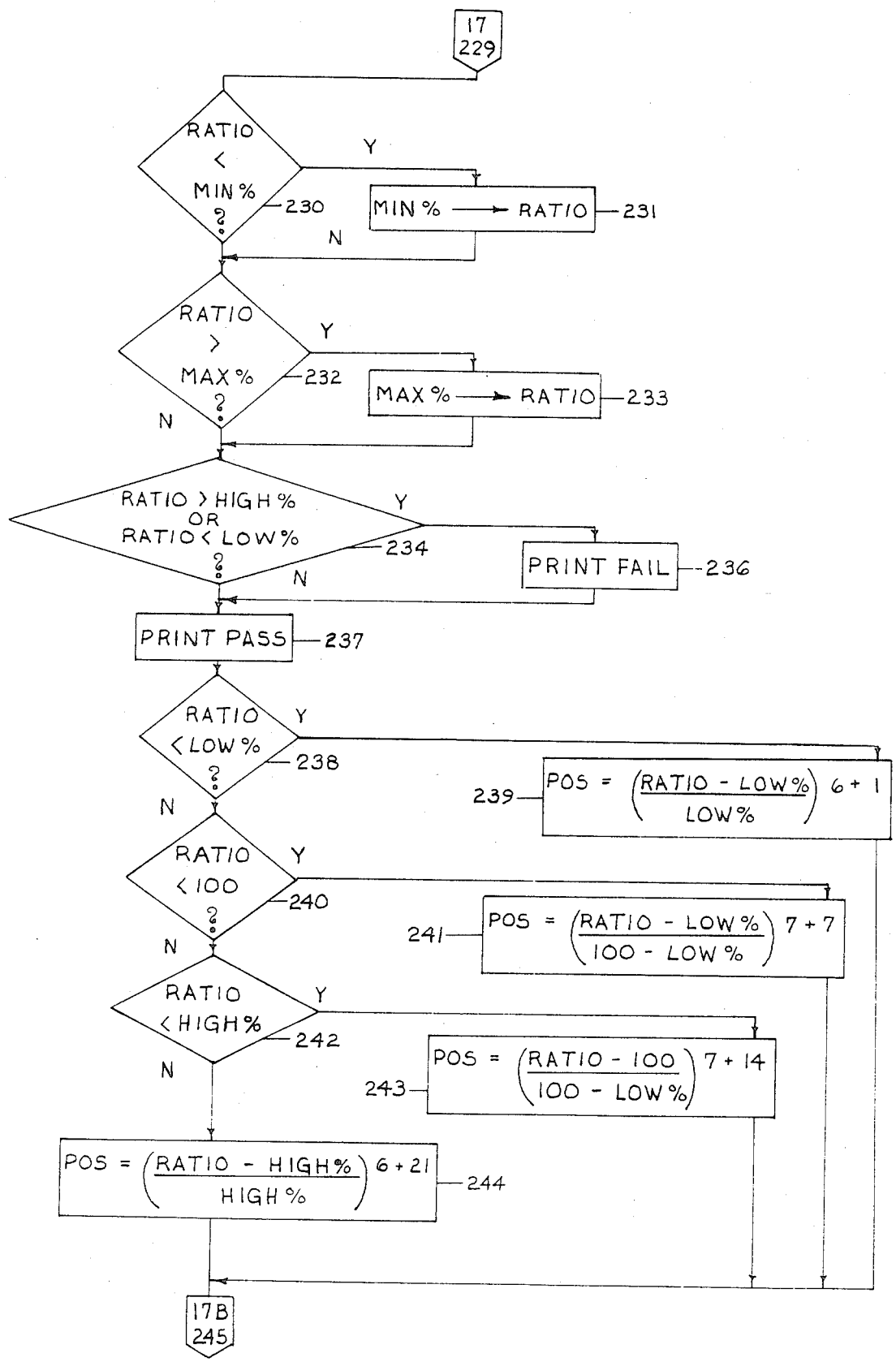
Figure 17B:
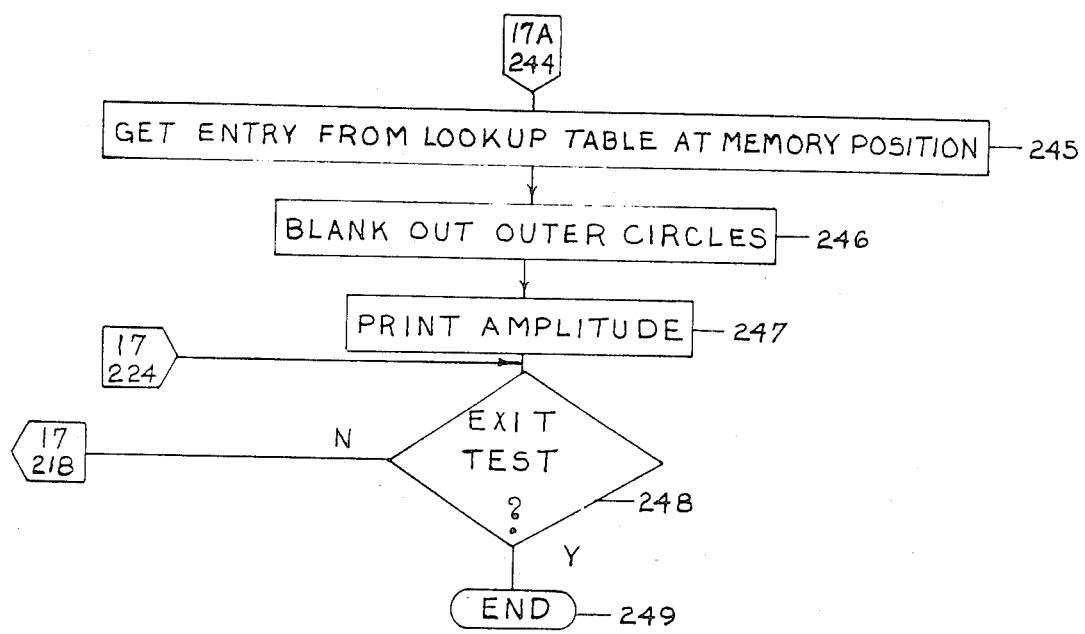

The program steps for the head resolution test are shown in FIG. 17. After the start of the test (215) the character and graphics display are drawn and a screen look-up table for each of the circles 213 from minimum to maximum size is created (block 216). The specification parameters from the EEPROM are then read and set in memory (217) and the selected high and low frequencies are written on two tracks on both sides of the disk (218). Reading heads are then switched (219), starting with head 0, and the head is moved to the low frequency track (220) and a sample is read and converted to digital data at 1 millisecond per point, for approximately 100 points (block 221). The average low frequency amplitude over the sample (AAMPLOW) is calculated and saved (block 222). The average low frequency amplitude is then compared to a threshold (223) and if it is below the threshold, an error message is given (block 224). If the amplitude is above the threshold, the head is moved to the high frequency track (225), a sample is read from the track and converted to digital data at 1 millisecond per point, obtaining 100 points (block 226), and the average amplitude (AAMPHIGH) over the sample is calculated (227). The average high frequency track amplitude is then compared to a threshold (block 228) and if below the threshold, an error message is provided (224). If the high frequency average amplitude is above the threshold, a RATIO is calculated of the average high frequency amplitude to the average low frequency amplitude (block 229) and the ratio is compared with a minimum percentage (230); if the ratio is below the minimum, the minimum percentage is substituted for the RATIO variable (231). The program then determines whether the RATIO variable is above a maximum percentage (block 232) and, if so, the maximum percentage is substituted for the RATIO variable (233). The RATIO variable is then compared with the pass band limits, the High percent and the Low percent (block 234). If the ratio is above the high percent or below the low percent "fail" is displayed or printed (236); while if the ratio is between the high and low percentage "pass" is displayed on the screen or printed (block 237).

The RATIO is then compared with the low percent alone (block 238) and, if it is below the low percent, a position variable to index the table created for the screen display (at block 216) is calculated as shown at the block 239 in FIG. 17. This is a fail condition and the position of the dots forming the pattern 213 will be entirely within the inner one of the circles 210. The number of circles of dots will be 1 plus 6 times the factor calculated in block 239. If the RATIO is greater than the low percent, the percent ratio is compared with 100 (block 240) and, if it is less than 100, the position of the circles patterns is calculated as indicated in block 241. The number of circles will be 7 plus 7 times the factor calculated therein, and the number of circles of dots displayed will be outside the inner circle but within the outer circle. If the RATIO is not less than 100, the ratio is then compared with the high percentage (block 242) and if it is less than the high percentage, the position of the dot circles is calculated as shown in block 243. The total number of circles will be 14 plus 7 times the factor calculated therein and will lie within the outer one of the circles 210. If the ratio is greater than the high percentage, a fail condition, the position is calculated as shown in block 244 and the pattern of dots will completely fill the area between the two circles 210 and will extend outwardly beyond the outer circle. Once the position variable POS is calculated in accordance with the foregoing procedure, it is used to get the entries from the lookup table which correspond to the pattern of dots forming the circles equal to the number of circle dots required by the position variable POS (block 245). The outer circles beyond the number specified by a position variable POS are blanked out (block 246) and, if desired, the amplitude of the high and low frequency signals may be directly printed (block 247). The program then checks to see if the TEST switch has been pushed (248); if not, the test is continued by returning to block 218 to again write high and low frequency signals on both sides of the disk. If the test switch has been pushed, the test is ended (249).

The radial alignment test measures the accuracy by which the heads are positioned on the tracks on the disk. Ideally, a disk drive would move the head to precisely the same radial location when reading or writing on a given track. Misadjustment of radial positioning with respect to a track is a major reason why diskettes may not be interchangeable between disk drives. For a single diskette to be read by two different drives, both drives must position their heads to essentially the same radial location for each track. This adjustment is fairly difficult to accomplish correctly utilizing presently available procedures since a large degree of operator judgment is involved. Double-sided drives with two heads pose additional problems since the single adjustment screw must be located in the best position for both heads.

The radial alignment test is accomplished using an analog alignment diskette which has two prerecorded tracks with a 125 KHz signal (approximately a triangle wave) recorded in an off-center circular path on the disk. The amplitude of the signal from the reading head varies as the recorded tracks move toward and away from the head. If the head is correctly positioned precisely on track center, the signal amplitude as seen on an oscilloscope gives a double-lobed or "cat's eyes" display with both lobes being of equal amplitude. If the head is not positioned precisely at the center of the track, the lobes will differ in size. Generally, drive manufacturers' specifications require that the smaller lobe be no less than 70 to 80 percent of the larger lobe. The alignment diskettes are recorded to provide the most accurate output at specified temperature and humidity conditions (e.g., 68° F. plus or minus 2° F. and 50% relative humidity plus or minus 5%). Both thermal and hygroscopic expansion and contraction of the diskettes strongly affect the location of the recorded alignment signal and therefore the ultimate precision of the alignment adjustment. These factors also affect diskette interchangeability.

Figure 8:
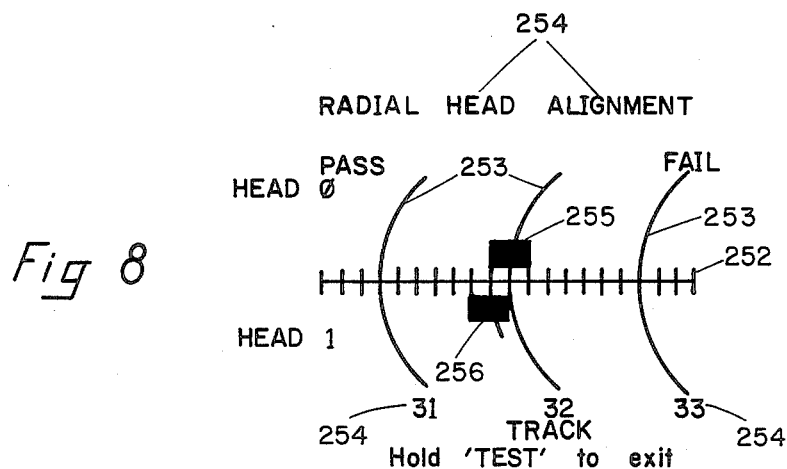
FIG. 8 is an exemplary display for a radial head alignment test.

The graphical information displayed on the screen 25 to the operator by the tester 20 during the radial alignment test is illustrated in FIG. 8. A reference frame is provided on the screen which is composed of a linear scale 252 with graduation markings thereon and segments of circular lines 253 intersecting the linear scale which are geometrically analogous to the recorded tracks on the diskette. Graphical characters 254 indicate to the operator the test that is being performed, the number of the track represented by the lines 253, and the identification of the heads which are represented on the screen by a rectangular head cursor figure 255 (head 0) and a second cursor figure 256 (head 1). When the rectangular cursor figures 255 and 256 overlie or intersect with the center track, this is an indication to the operator that the heads are aligned in a position where they will properly read that track.

Figure 9:
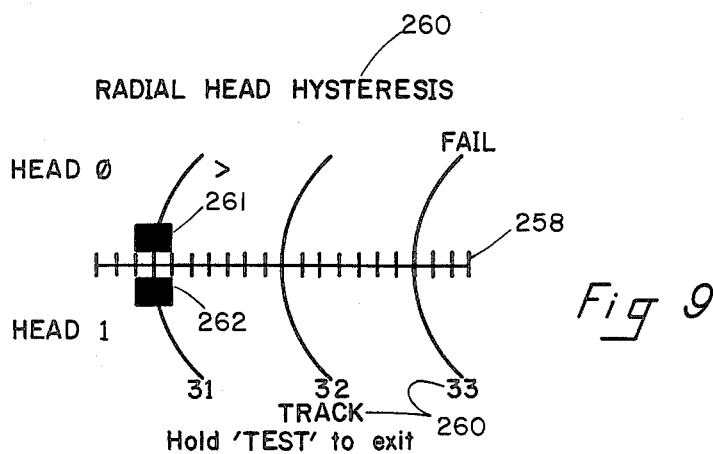
FIG. 9 is an exemplary display for a radial head hysteresis test.

A similar display is provided for the radial head hysteresis test, with the operator being provided with the display illustrated in FIG. 9. Again, a reference frame is provided consisting of a linear scale with gradations thereon 258, curved track simulating lines 259, character displays 260 indicating the test being performed and information on the tracks, and cursor figures 261 and 262 representing the position of the heads (head 0 and head 1 respectively). When the head is moved to a selected track, it should correctly center on the track regardless of the direction in which the track is approached by the head. If the stepper motor, head, or other components are loosely connected, then the final position of the head as it approaches a track may depend on the direction in which the track is approached. There is no adjustment of this variation in head placement, termed head hysteresis, since it results from a defect in manufacturing. Positioning hysteresis is detected by use of the radial alignment track on the alignment diskette. The lobes read by the heads should have the same relative magnitudes whether the head has approached the alignment track from one side or the other. The head hysteresis test is thus performed in substantially the same manner as the radial alignment procedure, but by approaching the particular alignment track from upper and lower tracks and determining radial alignment each time. FIG. 9 illustrates a situation which the head hysteresis is sufficiently bad as to have resulted in the heads reaching a wrong track when approaching from the lower track direction.

Figure 18:
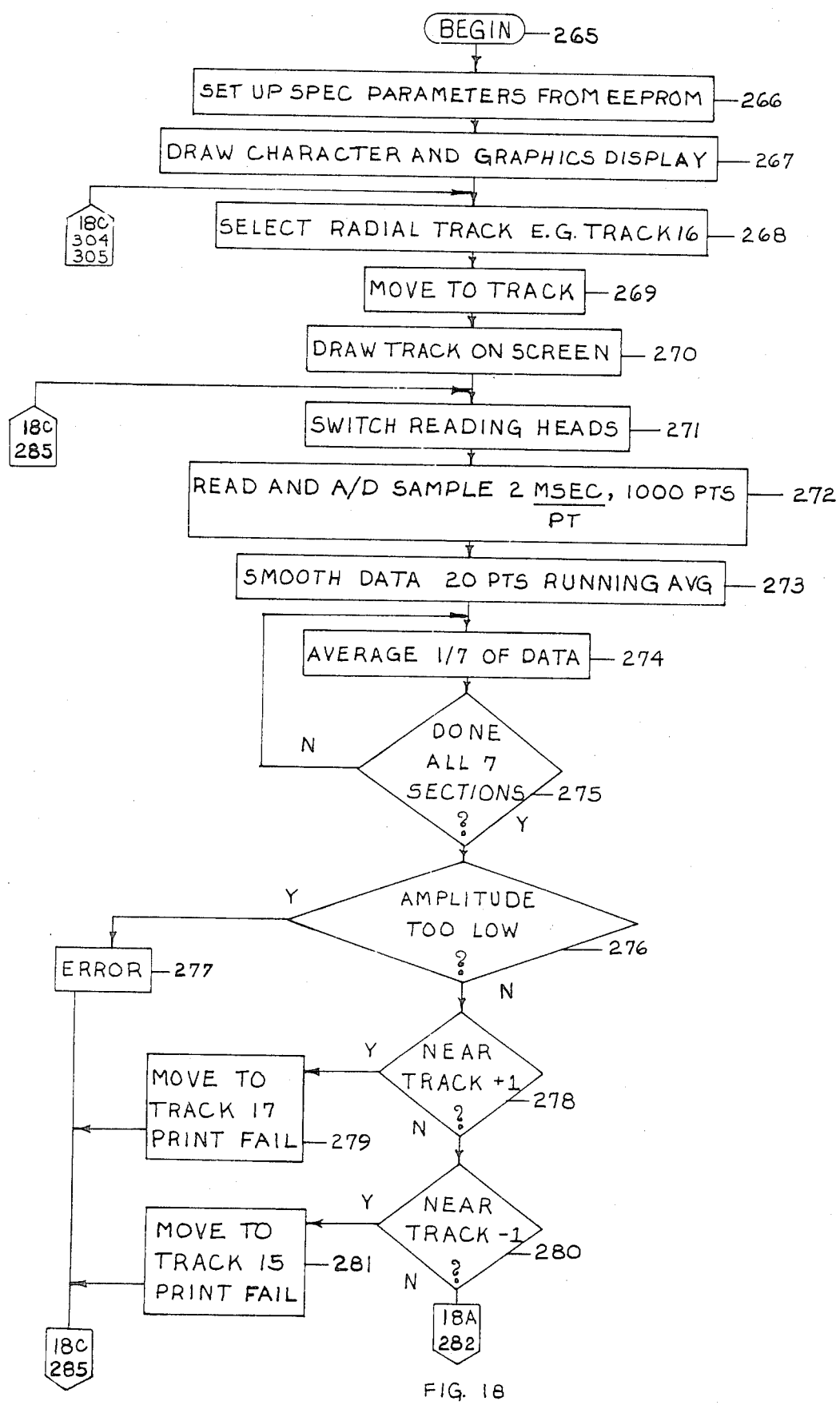
Figure 18A:
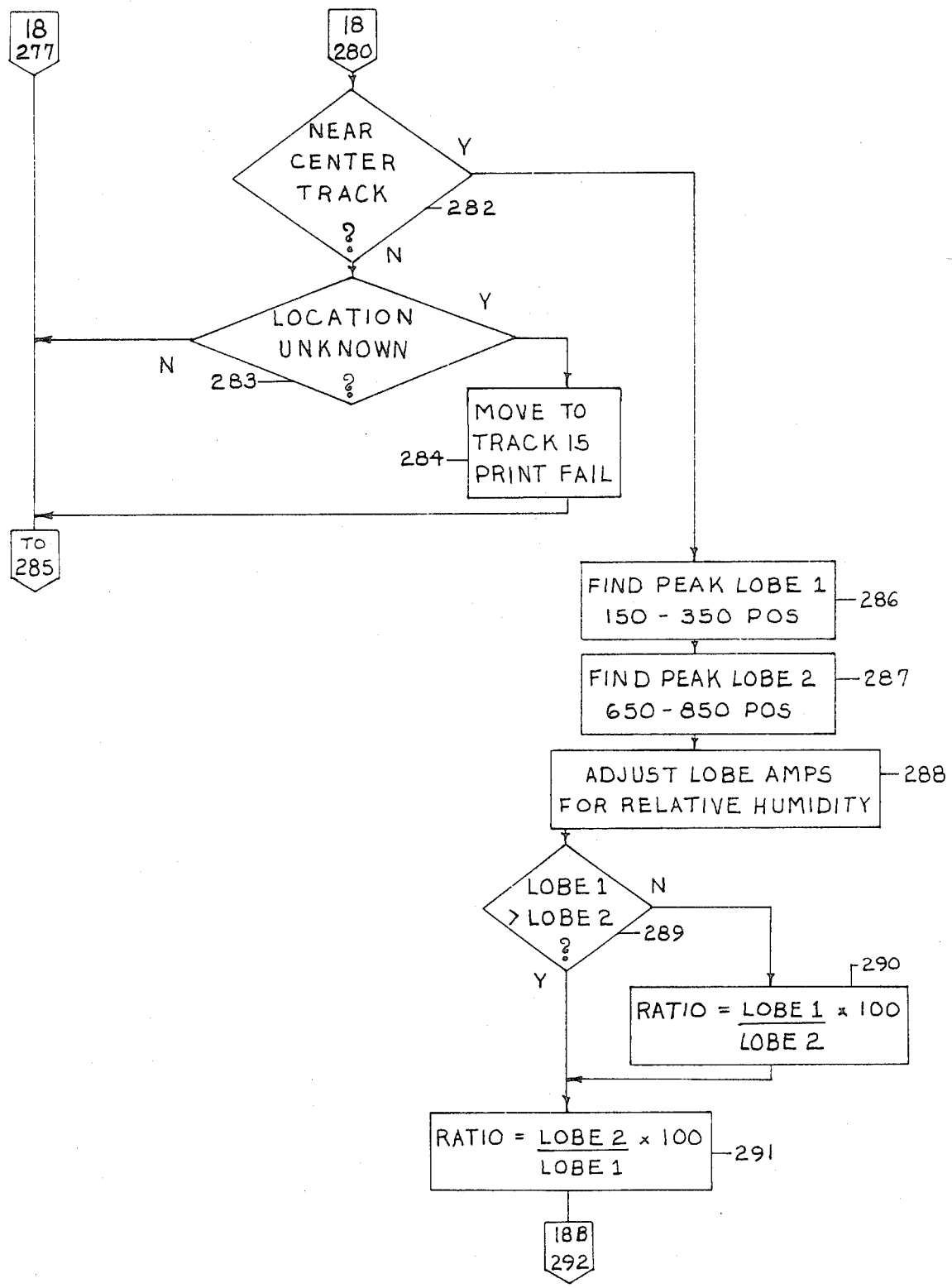
Figure 18B:
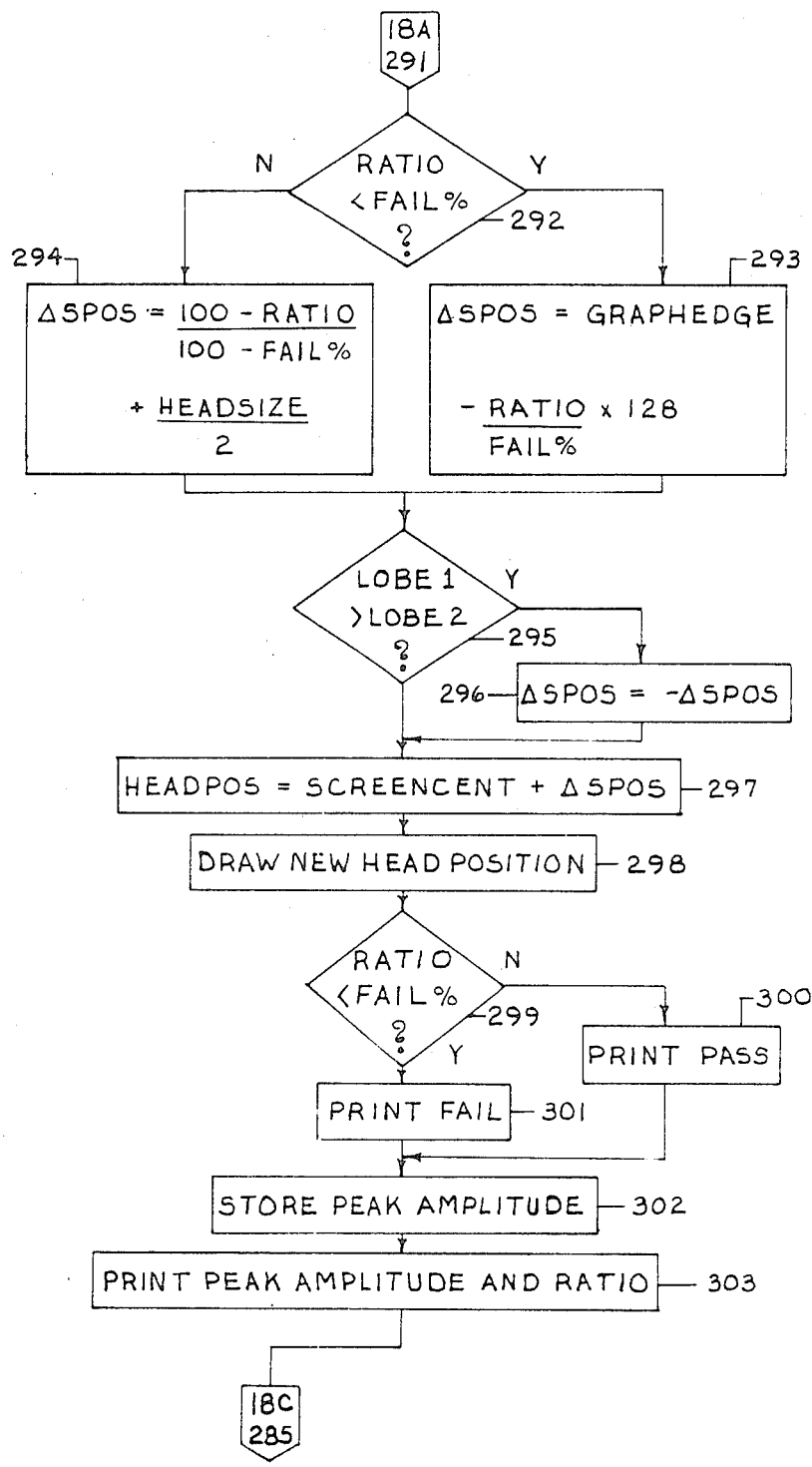
Figure 18C:
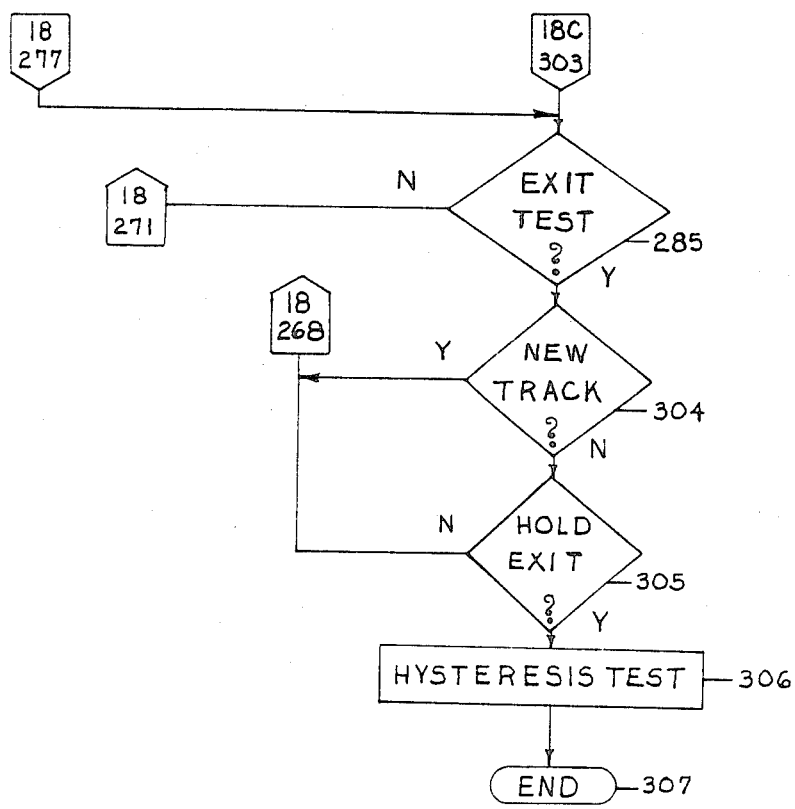

A flow chart for the radial head alignment test carried out by the tester 20 is shown in FIG. 18. After the test is begun (265), the specification parameters from the EEPROM are read in (266), including radial alignment track locations and acceptable lobe ratios, and the graphics and character displays are drawn on the screen (block 267). A radial track is then selected which contains the alignment signal (block 267)—for example, track 32—, the heads are moved to the track (269), and the simulated tracks 253 are labeled on the screen (block 270). The reading head is then switched (so as to begin with head 0) (271) and a sample is read and A/D converted over a period of two hundred milliseconds, corresponding to 1,000 data points (272). The data is then smoothed by taking a 20-point running average (273) and the 1,000 points, corresponding to a full revolution of the disk, are divided in seven sections and the data in one of the seven sections is averaged (274); the program then checks to see if all seven sections have been averaged (275), and if not, the cycle is repeated until all sections have been done. The averaged data from each section is checked with a threshold to determine if the amplitude is below the threshold (276) and, if it is, an error message is provided (block 277).

If the amplitude is not found to be too low, the reading from the head is checked to see if the head is nearer the track which is one above the desired track (278) and, if so, the head is moved to the track above (279) and "fail" is printed or displayed to the operator. If the head is not near the track one above, it is then checked to see if it is nearer the track one below the desired track (block 280) and, if so, the head is moved to the track below (281) and "fail" is printed or displayed to the operator. If the head is not near the track one below, the program then checks to see if the head is near the center or desired track (block 282); if not, the position of the head is checked to see if its location is unknown (283) and if it is, the head is moved to the track one below (e.g., track 16) and "fail" is displayed or printed (block 284) and the program moves on to check if the TEST switch has been pressed by the operator (285).

If the head is found to be near the center track in block 282, the program then continues to find the peak of the first lobe which is expected in the data array between 150 to 350 (block 286) and the peak of the second lobe in the data array from 650 to 850 (block 287). The lobe amplitudes are then adjusted for relative humidity (block 288) as determined by the relative humidity entered on the EEPROM 26 by the user. Lobe 1 and lobe 2 are then compared (289) and if lobe 1 is larger than lobe 2, the present RATIO between them is determined as lobe 1 amplitude divided by lobe 2 amplitude times 100 (block 290). If lobe 1 is not larger than lobe 2, then the RATIO variable is determined as lobe 2 amplitude divided by lobe 1 amplitude times (291). The ratio is then compared with the fail percentage (block 292) to determine if it less than the fail percentage. If so, a variable change in screen position ($\Delta$SPOS) is determined as indicated in block 293 where GRAPHEDGE is the edge of the graph scale 252 in screen position. If the ratio is greater than the fail percent, the change in screen position variable SPOS is calculated as given in block 294. The direction of change of position of the heads is determined by comparing lobe 1 with lobe 2 (block 295); if lobe 1 is greater than lobe 2, the change in screen position is substituted with its negative (296). The head position is then calculated as the screen center position plus the change in screen position variable (block 297) and the new head position is drawn (block 298) by adding the offset to all the display memory locations where the head graphics are located. The ratio is then compared with the fail percent (block 299) and if less, a "fail" message is printed or displayed (block 301); whereas if the ratio is not less than the fail percent a "pass" message is printed or displayed (block 300). The peak amplitude of the lobes is then stored (302) and the peak amplitudes and ratios may be printed or displayed to the operator if desired (303) before the program checks to see if the test switch has been pushed indicating that a change in test is desired by the operator (block 285). If the TEST button is not pushed, the program cycles back to block 271 to switch reading heads and begin the cycle anew. When the TEST switch is pushed, the program checks to see if a new track is to be read (304) and and, if so, recycles back to block 268 to select the radial track. If not, the program continues and waits until the operator holds the test button down for a period of time (block 305) and recycles through the program until he does so. When the operator presses the TEST button for a sufficient length of time, the program proceeds to the hysteresis test (306) which moves the head to the radial alignment track from opposite sides of the selected radial alignment track. The approach direction continues to alternate between an upper and a lower track as specified on the EEPROM 26. Determination of radial head position is accomplished as in the radial alignment test beginning with block 268. The peak amplitudes as determined in the hysteresis test may then be compared with the stored peak amplitudes from the previous hysteresis test to determine if change in peak amplitudes has occurred, indicating that the heads are not returning to the same position on the alignment tracks. After completion of the hysteresis test, the test procedure is ended (307) and a new test procedure is initiated.

The head azimuth test determines the angle between the center line of the head and a line tangent to the diskette track. The head azimuth angle may not be adjustable, depending on the model of drives, and in some cases the head may have to be replaced to correct excessive azimuth angle. Conventional measurements of the azimuth angle have required a substantial degree of operator judgment. The test data are obtained using an analog alignment diskette having a track with four bursts of data written at 125 KHz with each burst being written at a different angle, typically clockwise 62 minutes, counterclockwise 38 minutes, clockwise 38 minutes, and counterclockwise 62 minutes from a tangent to a track circle. Since the amplitude of the signal as read by the head varies in proportion to the change in the azimuth angle, the azimuth angle is determined by the difference in signal amplitude between the four bursts. Burst magnitude comparisons between the four bursts can be used to calculate azimuth angle utilizing the correlation between the signal amplitude and head gap, azimuth angle, and data bit density. A typical specification for azimuth angle is plus or minus 12 minutes from true tangent.

Figure 10:
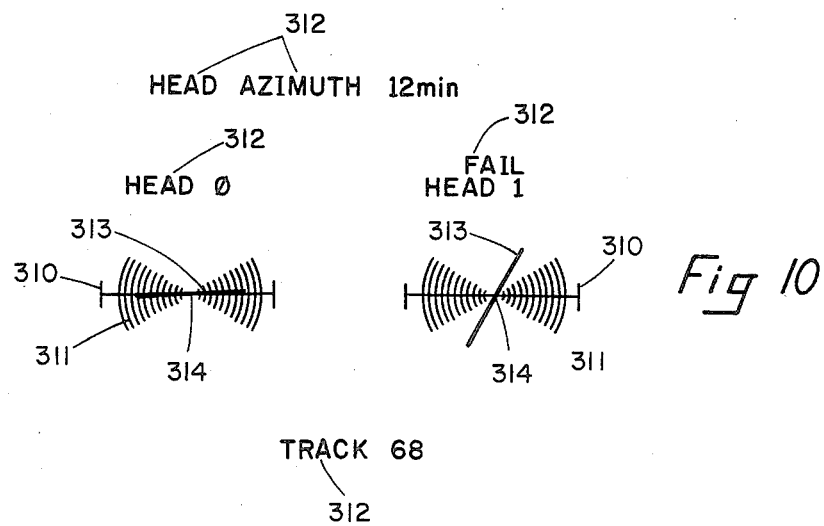
FIG. 10 is an exemplary display for a head azimuth test.

The graphics displayed to the operator on the screen 25 by the tester 20 during the head azimuth test is illustrated in FIG. 10 for a two-head drive. For each head there is a reference frame composed of a linear horizontal scale 310 and pairs of sectors of a circle 311 centered on the scale 310 and formed of segments of concentric circular lines which together define the sector. Characters 312 are displayed which label the particular test being conducted, the particular head to which the two reference frames apply, and the track from which the azimuth data is being read. The cursor figure indicating the angle of the head with respect to the tangential is a straight line 313 which is turned about the central point 314 of the linear scales 310 at an angle proportional to the detected head azimuth angle. If the cursor line figure 313 are turned at an angle that causes the lines to still lie within the sectors 311, the head azimuth test is passed; whereas if the cursor line figure is turned at an angle such that it lies outside of the sectors 311, the head azimuth test is failed, as illustrated for head 1 in FIG. 10.

Figure 19:
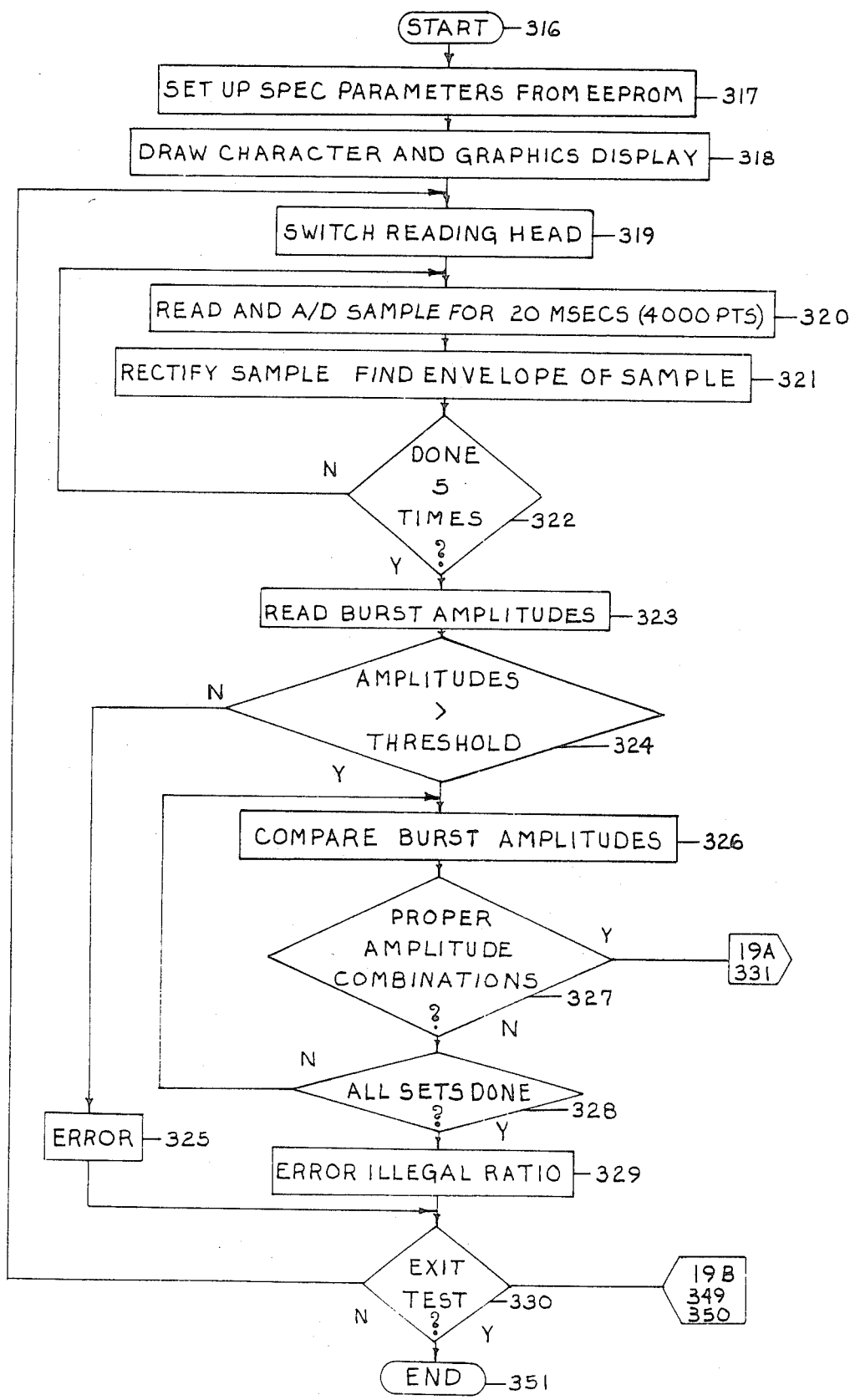
Figure 19A:
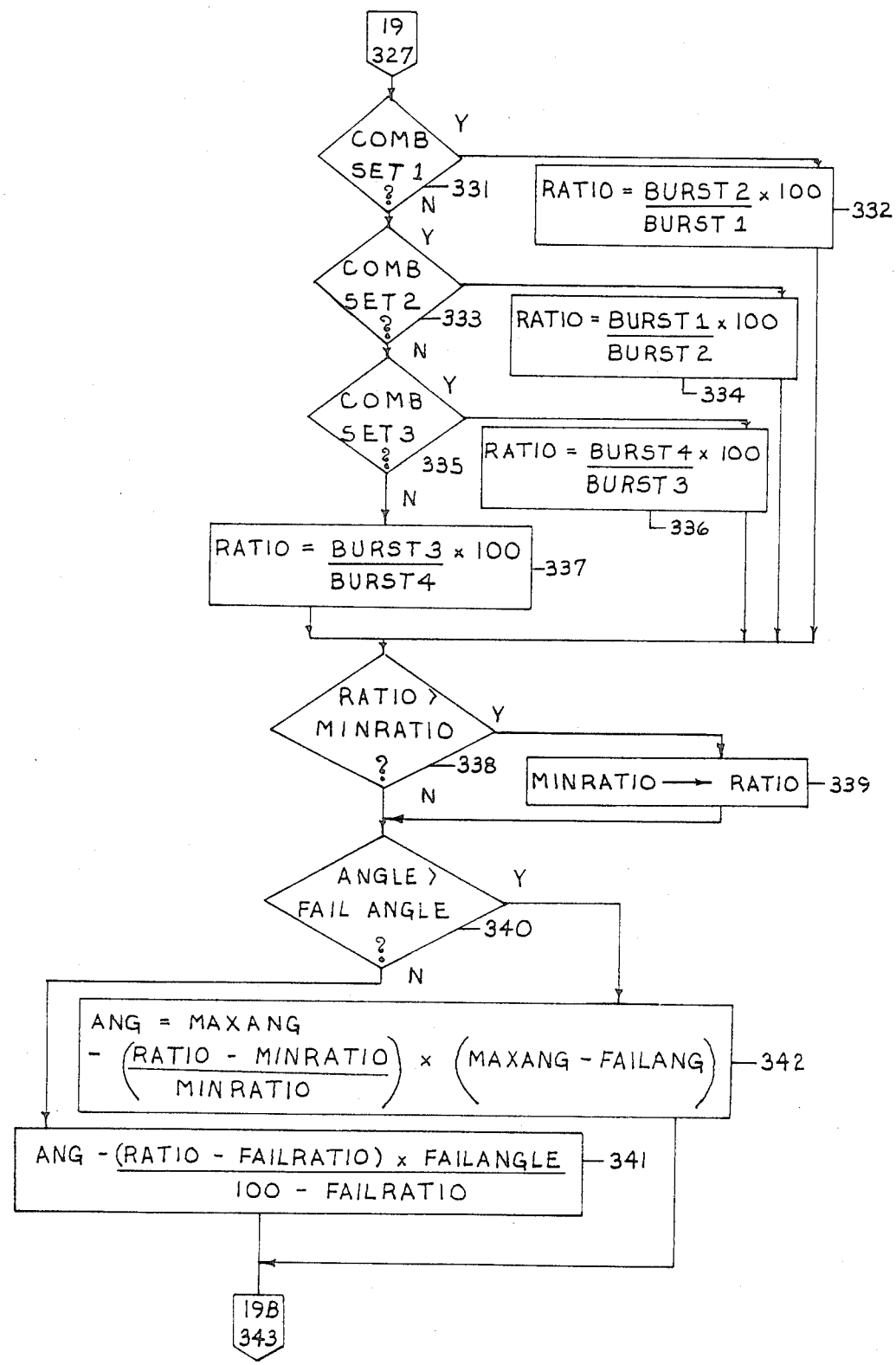
Figure 19:
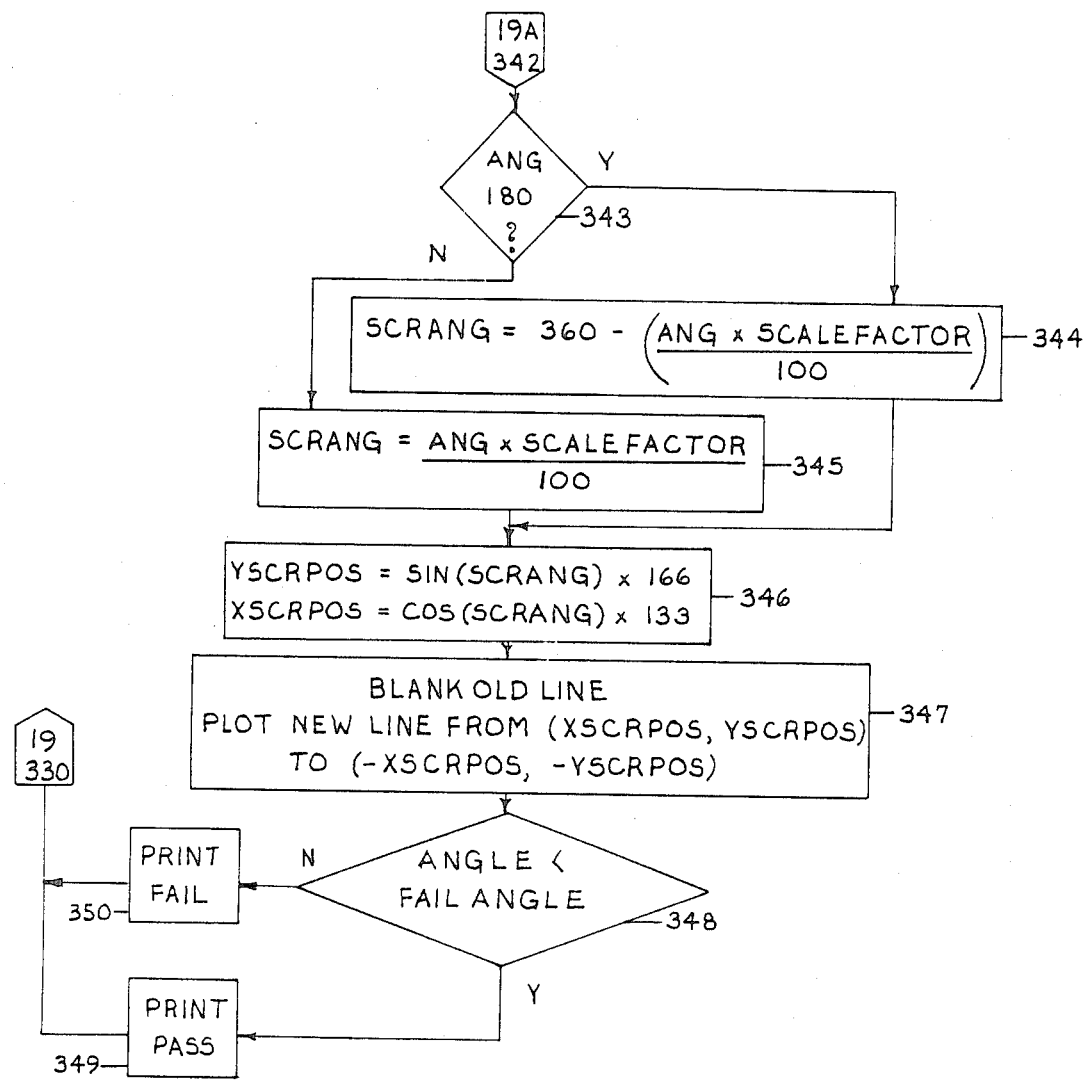

The flow chart for the head azimuth angle test is shown in FIG. 19. After start of the test procedure (316) the specification parameters are set up in memory from the EEPROM (block 317), including acceptable pass angle, and the character displays 312 and graphic displays 310 and 311 are drawn (313). The reading heads are then switched (block 319) (to begin with head 0) and a sample is read and converted to digital data for 20 milliseconds (4,000 points) (block 320). The sample data is then rectified and the envelope of the sample is found (321) and the program continues until the procedure has been completed five times (322). The amplitudes of the four bursts of data which are detected for each revolution of the disk are read (323) and the amplitudes are compared with the threshold to determine if they are all above the threshold (324); if not, an error message is provided (325). If the amplitudes are above the threshold, the amplitudes of the four bursts are compared with each other (326) and a determination is made whether a proper amplitude combination is found when comparing the four bursts (327). If not, the program continues to check if all of the possible amplitude combinations of data have been considered for each of the bursts (328) and if not, proceeds back to block 326 to compare the burst amplitudes once again. If all possible combinations have been checked, an error message is sent indicating an illegal ratio to the operator (329) and the program continues to wait for the TEST switch to be pushed (330) and will recycle back to the switching of the reading heads at block 319 and proceed through the program until the TEST switch is pressed by the operator.

If the proper allowed combinations of burst amplitudes are found at block 327, the program continues to determine the azimuth angle. The test is first made for combination set 1—magnitudes of burst 1 and burst 3 greater than burst 2 which is greater than burst 4—which is indicative of a head being badly out of azimuth alignment and out of specification (331). If this combination is found, a RATIO variable is calculated as the ratio of the magnitude of burst 2 to burst 1 times 100 (block 332). If combination set 1 is not found, combination set 2 is checked (block 333), e.g., wherein the magnitude of burst 4 is less than or equal to burst 1 which is less than burst 2. If this combination is found, the RATIO variable is calculated as the ratio of burst 1 to burst 2×100 (block 334). If combination set 2 is not found, the burst magnitudes are then checked for combination set 3 (block 335), e.g., the magnitude of burst 1 less than burst 4 less than or equal to burst 3 which is less than burst 2. If this combination is found, the RATIO variable is calculated as the ratio of burst 4 to burst 3 times 100 (block 336). If combination set 3 is not found, the remaining combination indicates an azimuth head angle badly out of specification and the ratio variable is calculated as the ratio of burst 3 to burst 4 times 100 (block 337). The RATIO variable so calculated then compared with a minimum ratio (block 338) and if it is not larger than the minimum ratio, the MINRATIO term is substituted for the RATIO variable (339). The RATIO variable corresponds to an azimuth angle of the head with respect to the tangent; the angle or ratio is then compared with a fail angle or ratio (block 340) and if the angle is not greater than the fail angle, the variable ANG is calculated as shown in block 341. If the angle is greater than the fail angle, the variable ANG is calculated as shown in block 342. The variable ANG corresponds to a head azimuth angle ranging from 0 to 360 degrees and is first compared with 180 (343) and, if larger, a screen angle variable SCRANG is defined as indicated in block 344. If ANG is not greater than 180, the screen angle variable is calculated as shown in block 345, where SCALEFACTOR is a scaling number selected to obtain a desired displacement of the cursor lines 313 with respect to the pass band indicated by the shaded area 311. The termination points of the line 313 on the screen are calculated as indicated in block 346 and a new line is plotted from the plus to the minus X and Y coordinates (block 347) as previously calculated. The angle of the head is then compared with the fail angle indicating the limits of the "pass band" represented by the sectors 311, and if the angle is less than the fail angle (block 348) a "pass" message is granted or displayed (350). If the angle is greater than the fail angle, "fail" is printed or displayed (block 350). Thereafter, the program waits for the pushing of the test switch by the operator (330) and continues to cycle through the program until the button is pushed whereafter the test is ended (351).

The tests described above are preferably performed in the following sequence to ensure proper operating conditions for each test: spindle rotation speed, track zero sensor position, radial alignment and hysteresis, head azimuth, index pulse timing, hub centering, and head resolution. Any or all of the tests may be selected by the user, as desired.

Window margin tests are digital tests which attempt to predict long term disk drive performance in its essential function of wiring and reading data. Proper operation of a computer system incorporating a disk drive is based on the expectation that the disk drive will send a steady stream of closely timed digital pulses which can be decoded using logic circuitry driven by a phase lock loop oscillator which is synchronized to the incoming pulses and which provides the timing necessary to separate individual data bits. Although the phase lock loop oscillator can adjust for gross timing changes due to spindle rotation speed variation, diskette flexure, and so forth, it is not able to adapt to closely spaced timing changes. Significant bit-to-bit timing changes can be caused by noise picked up by the read/write head, crosstalk from the nearby erase heads, and the tendency of closely spaced magnetic domains to interact with each other. Additional timing jitter may also be introduced by inaccuracies in the phase lock loop signal.

The window margin analysis allows long term data bit timing to be judged. Data bits which consistently arrive in the middle of the timing window are said to have large window margins since they have large safety margins on either side of the center of the window. Data bits which arrive early or late in the timing window are said to have small window margins. A statistical plot of data bit timing will generally conform to a normal or Gaussian distribution. The spread of the distribution curve is signficant in window margin analysis since it allows sampling of a relatively limited number of timing bits and prediction of the probability of individual bits having large timing differences beyond the threshold. The tester 20 conducts the window margin analysis by timing the separation of data bits to the nearest 10 nanoseconds and storing the separation time in the data memory 43 for further analysis. The reliability of the test will be related to the total number of bits recorded, a function of the allowable test time, which can be determined by the user.

Figure 11:
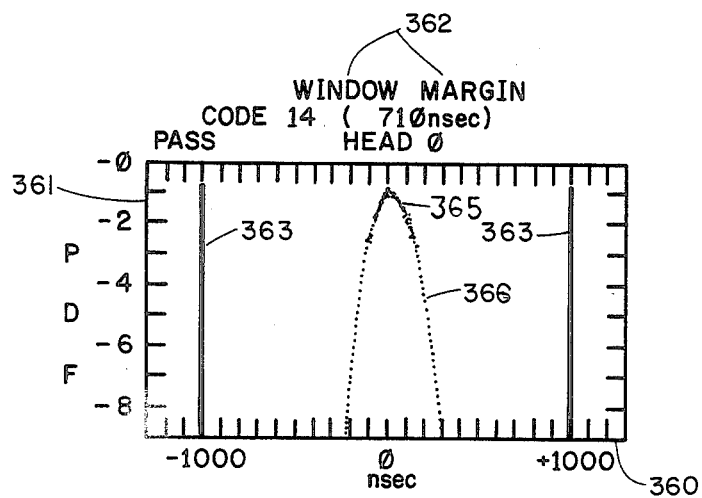
FIG. 11 is an exemplary display for a window margin test.

After determining and storing the bit separation times, the tester 20 uses a program routine which simulates the action of a phase loop oscillator and data separator. The separation times of a group of sequential data bits are averaged to determine the "oscillator" frequency. The calculated timing window boundaries are then placed between bits using a least squares fit algorithm. With these timing window boundaries correctly positioned, the tester can then determine the relative arrival position of the next data bit within the timing window in the series. The result is stored in memory and the calculation repeated after moving downstream one data bit. If a total of 4,000 data bit arrival times are measured and the number of bits used to determine each average is ten, the calculation will be repeated a total of 3,990 times. The result of the window margin test is displayed on the screen 25 in a graphical display as illustrated in FIG. 11. The graphical display includes a reference frame composed of a horizontal linear scale 360 graduated to show the spread about the center point, and a vertical scale 361 corresponding to a probability density function. Characters 362 are displayed which indicate the test being reported, the head being tested, and the numerical boundaries of the horizontal and vertical scales. The boundary lines for acceptable window margins 363 define the boundaries of the test. The data bit arrival times are plotted on the graph with respect to the reference frame to define a curve 365, with each plotted point in the curve 365 representing the number of occurrences of a particular timing value such that the more often a particular value occurs, the higher it is plotted on the graph. The vertical axis is plotted in powers of ten on the curve. A curve 366 fitted to the plotted data values is extended down to the level specified for error-free operation, with an acceptable limit being one timing related read error in every billion bits. Graphically, a drive is displayed as being acceptable to the operator if the fitted curve 365 stays between the window margin and the edges 363.

Figure 20:
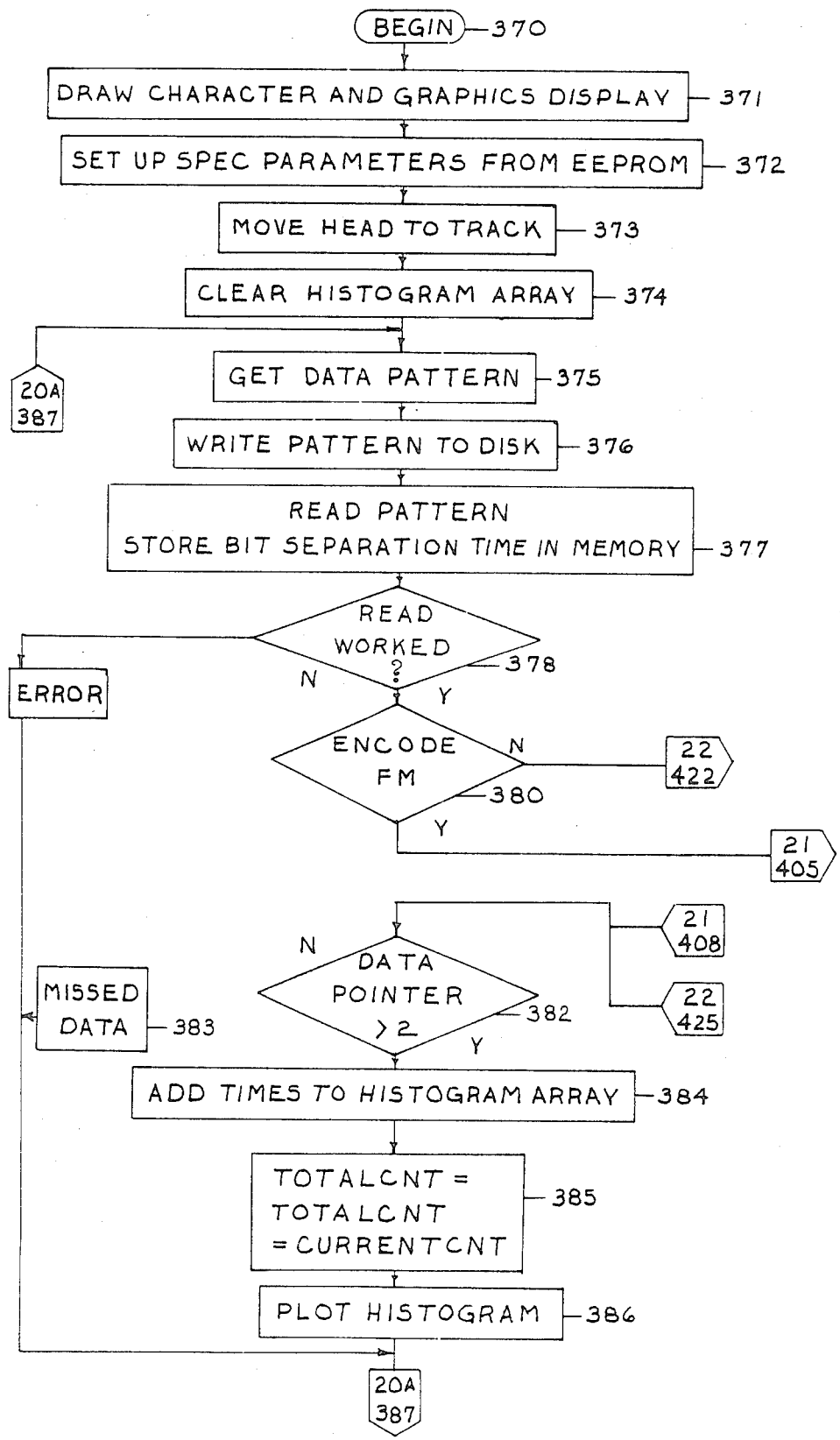
Figure 20A:
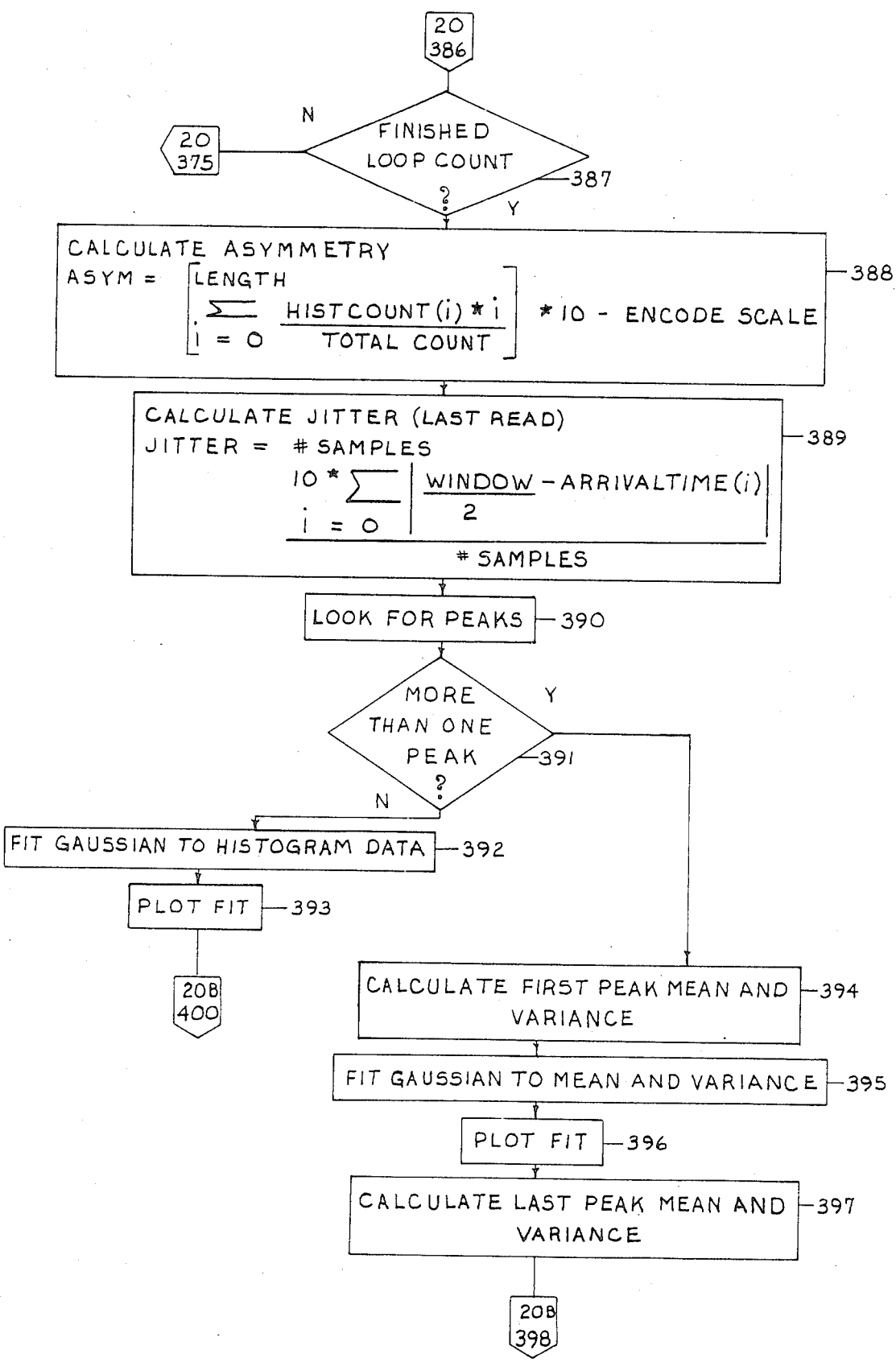
Figure 20B:
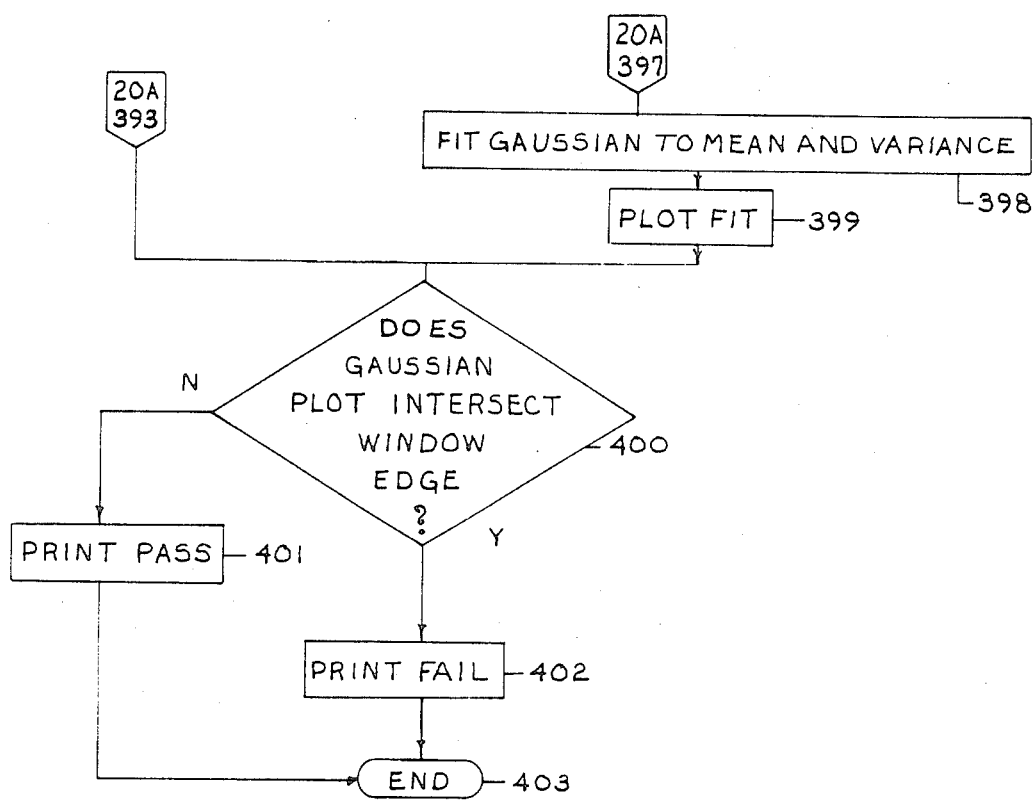
Figure 21:
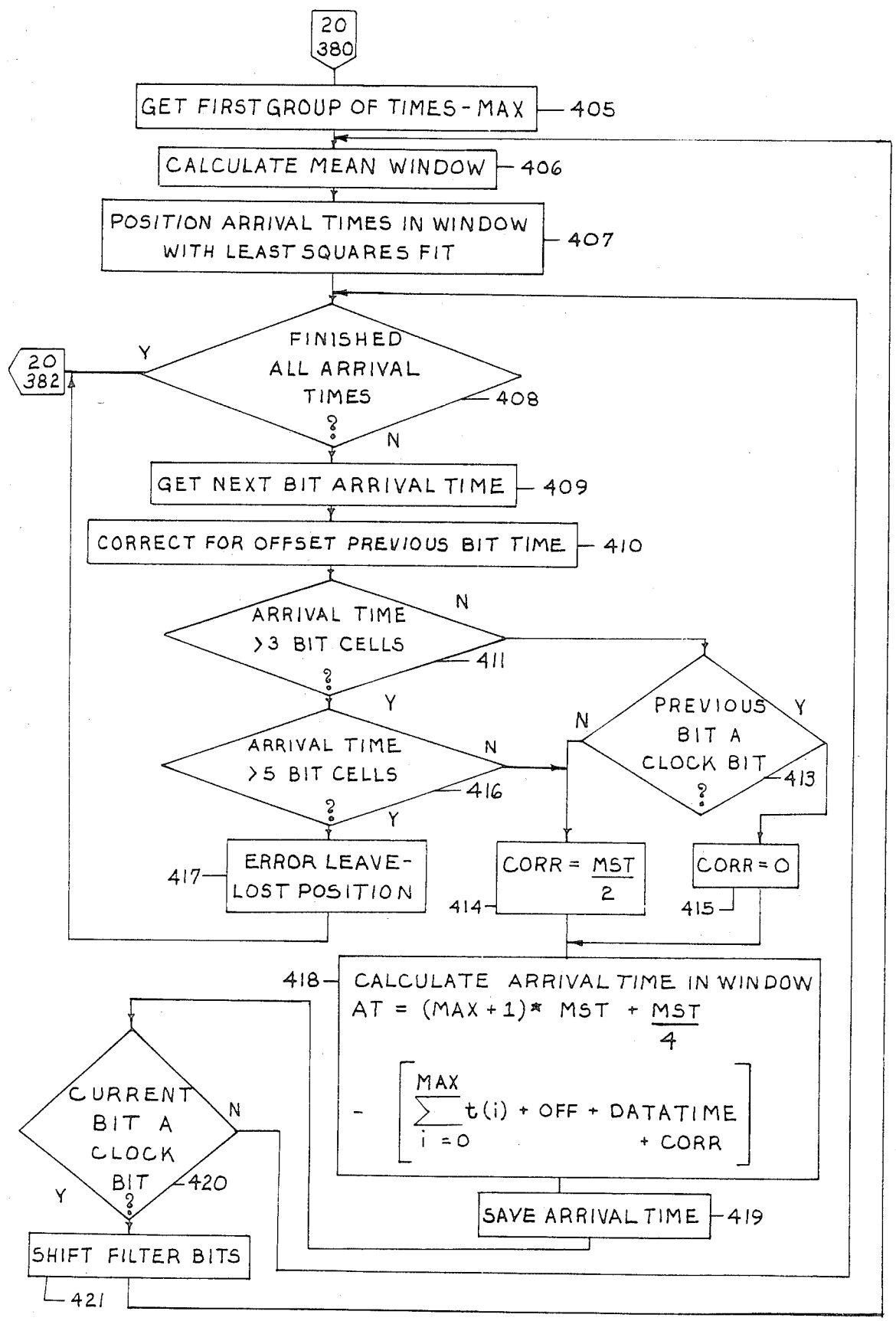
Figure 22:
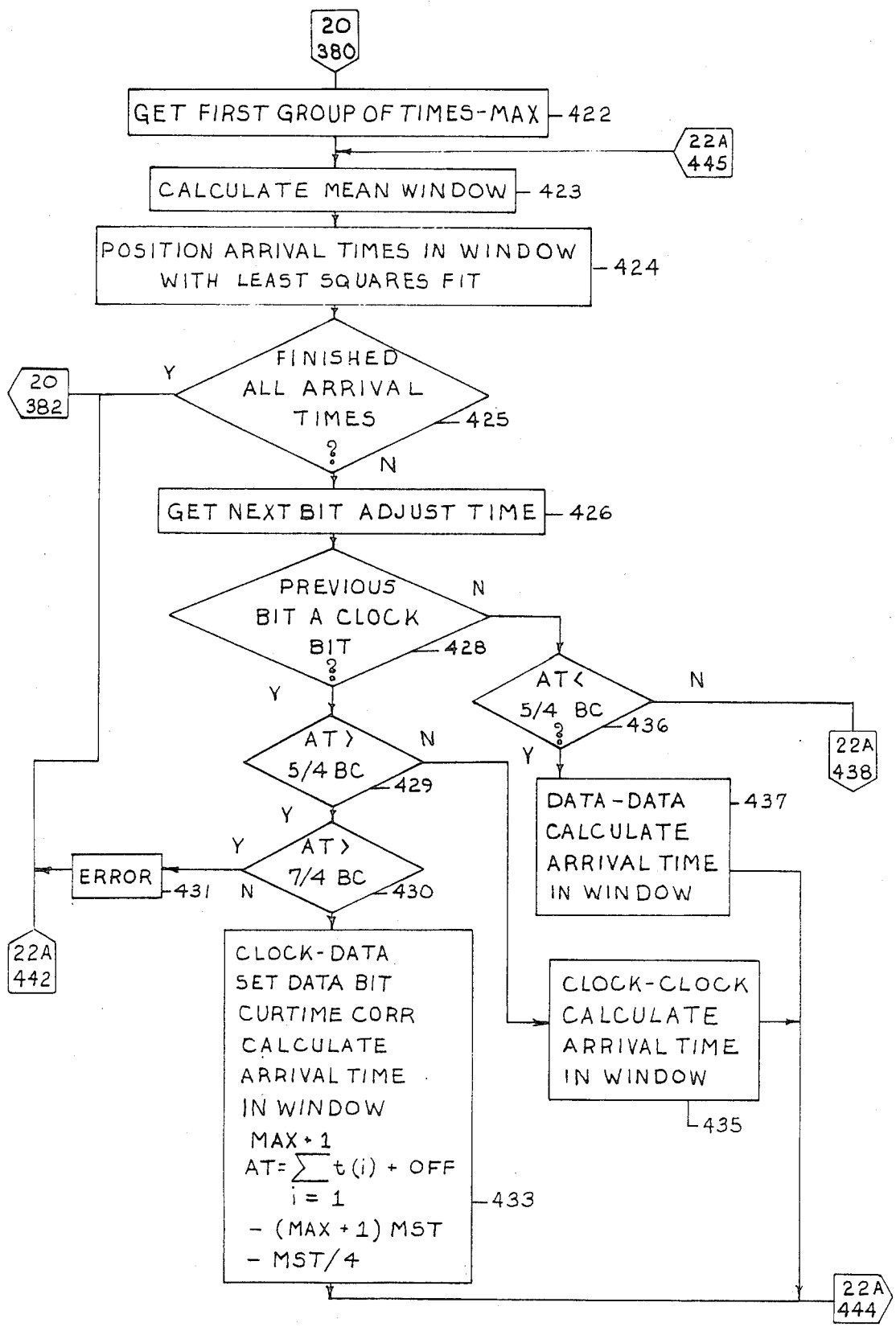
Figure 22A:
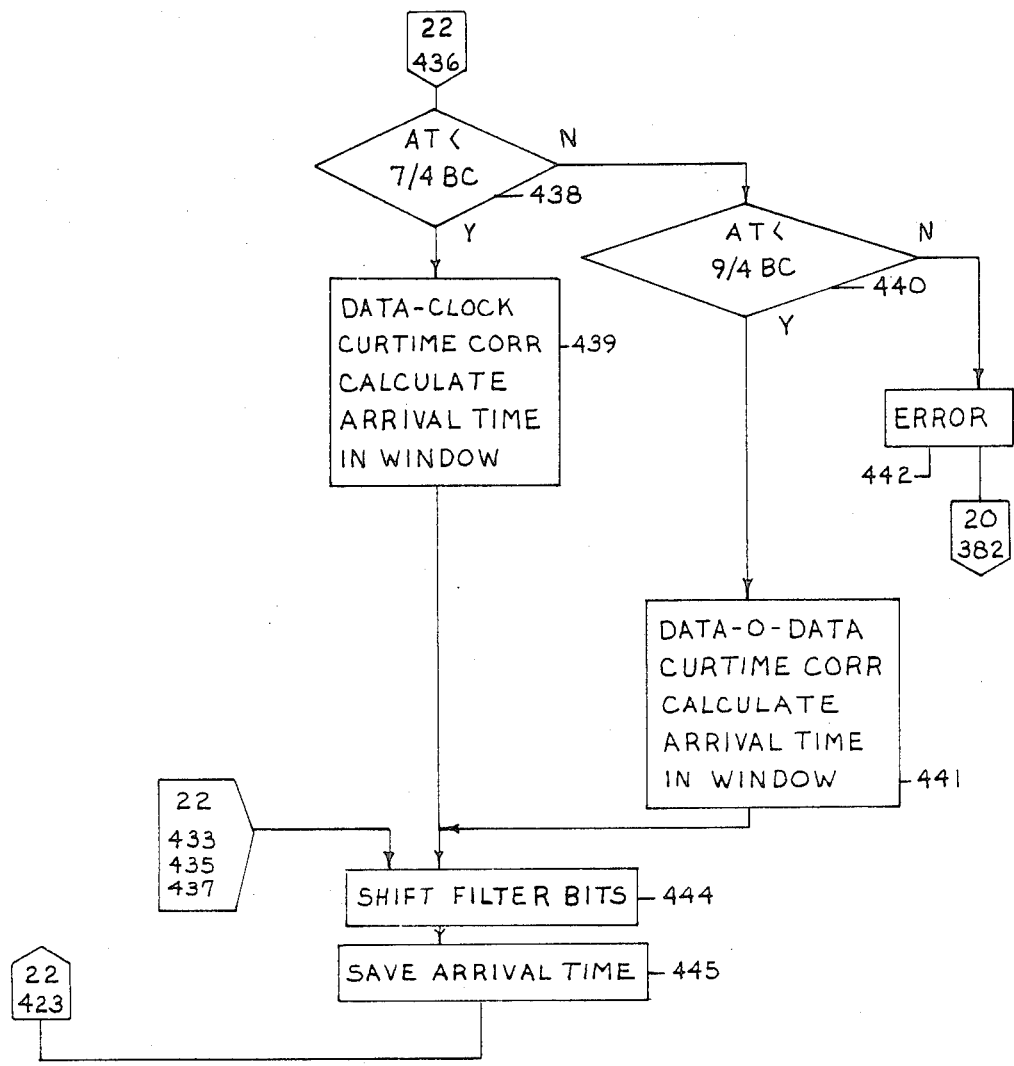

The flow chart of the program which performs the window margin analysis is shown in FIGS. 20–22. With reference to FIG. 20, when the window margin test is initiated (block 370), the character and graphics displays on the screen 25 are first drawn (371), specification parameters from the EEPROM, including the track to be read, the type of encoding, the disk speed, and user selected data pattern, are read in from the EEPROM (372), the head is moved to the selected track (373), the histogram array in memory is cleared (374), and the selected data pattern to be written is obtained (375) and written onto the disk (376). After completion of the writing of the pattern to the disk, the track is then read and the bit separation times are stored in memory (377). A check is made to determine if the read worked (378), and if not, an error message is sent (379). If the reading was successful, the type of encoding for the data is checked (380). If the encoding is in frequency modulation (FM), the program proceeds to the routine shown in FIG. 21. If the encoding is not FM, i.e., is modified frequency modulation (MFM), the program proceeds to the steps shown in FIG. 22 to perform the simulated phase lock loop functions, as explained further below.

After returning from the phase lock loop simulators shown in FIG. 21 or FIG. 22, the program checks to see if the data pointer is greater than 2, to check to be sure that the software emulating the phase locked loop was able to convert the bit separation times into bit arrival times within the read window. If the data pointer is not greater than two, this indicates that no new data was found, and the missed data is ignored (block 383). If the data pointer is greater than 2, the arrival times calculated are added to the histogram array (block 384) which is comprised of a number of cells, e.g., 400, which span the range of arrival time between the intended window margins (e.g., 2,000 nanoseconds). The total number in each of the cells of the histogram will build up over time with each cycle through the program loop as additional arrival times are found which are within particular cells. The current total count of entries into the histogram array is added to the total of counts in the histogram array previously to provide a new total count (385) and the histogram is then plotted (block 386) to give the curve illustrated at 365 in FIG. 11.

The number of times a program has gone through the loop is then checked and compared with the selected loop count that has been provided by the user in the EEPROM (block 387), and if the total number of loops has not reached the desired number, the program returns to block 375 to get an additional data pattern. When the number of turns through the loop has been completed, the asymmetry of the histogram is calculated (388) where HISTCOUNT (i) is the total number of counts in the cell i, LENGTH is the total number of cells in the histogram (e.g., 400), and ENCODE SCALE is an offset factor constant which will depend on the type of encoding, FM or MFM, used for the data on the disk to adjust the asymmetry value in reference to the display center. The sum is multiplied by ten, which is the period of the counter. The "jitter" of the last data pattern read is then calculated as shown in block 389, where # SAMPLES is the number of samples of disk arrival times that were taken, WINDOW is the window time within which the bits should arrive and ARRIVAL TIME (i) is the arrival time of the ith sample. The calculated assymetry and jitter may be read out, if desired, as numerical criteria for engineering analysis of the performance of the disk drive.

The program then proceeds to examine the histogram for peaks in the data (390). If no more than one peak is found (block 391), the sample mean and variance are calculated and a Gaussian curve is fit to the histogram data (block 392) and the Gaussian curve so determined is plotted on the screen 25 (393) superimposed over the points of the histogram plot. If more than one peak is found, the mean and variance of the first peak in the histogram data is calculated (block 394) and a Gaussian distribution is fit to this mean and variance (395) and the Gaussian curve is plotted (396) superimposed over the existing data. The last peak in the data (i.e., the one furthest away from the first peak toward the other window margin) is then examined to determine its mean and variance (397), a Gaussian curve is fit to this mean and variance (398) and the Gaussian curve so determined is plotted on the screen 25 (399). Any additional peaks between the first and the last peak are ignored and the Gaussian curves are plotted on the assumption, generally correct, that the data that makes up the first peak does not interfere with the data in the last peak. More than one peak in the histogram data is often observed even with disk drives having satisfactory performance, since adjacent bits in certain combinations of bits recorded on the magnetic media of the disk will tend to repel one another, systematically separating arrival times of data read from the disk depending on the pattern of adjacent bits.

After the Gaussian curves are determined for either the one peak or multiple peak cases, the Gaussian curves so calculated are then compared with the window margin to see if the Gaussian plots intersect the window edge; that is, the Gaussian curve will intersect the window edges (as shown in FIG. 11, minus 1,000 and plus 1,000 nanoseconds) if at one or both of the window margins, the value of the calculated Gaussian curve is greater than or equal to one billionth, which is the bottom line on the probability density function scale 361 shown in FIG. 11. This level of probability of error is shown as an acceptable value, although other specifications, more or less stringent, may be utilized. If the Gaussian plot does not intersect the window edge (block 400), the term PASS is printed or displayed to the operator (401); if the Gaussian plot does intersect the window edge on the graph, the term FAIL is displayed (block 402), and after printing the message, the program ends (403).

The simulated phase lock loop manipulation on the arrival time data is performed on FM data as shown in FIG. 21. FM encoded data base has a clock bit separating each data bit whereas in MFM a clock bit is written only under certain circumstances; for example, where data is comprised of three zeros in a row, a clock bit is written in the clock window preceding the second zero. The section of the program shown in FIG. 21 begins by getting a first group of separation times between bits read, the group having a selected number MAX (e.g., 10) of bits. The mean separation time MST can then be calculated as the sum of all of the separation times of the bits divided by the number of bits MAX (block 406). The separation times can then be fit in a sequence of windows equal in number to MAX using a least squares fit procedure to locate the starting point in time of the first window with respect to the first bit (block 407). After checking to see if all arrival times have been finished (408), the program then gets the next bit separation time (block 409), and a correction in the separation time between the last and next to last bit is made to treat the separation as if the next to last bit had been located precisely in the center of the mean window which had been calculated. The program then checks to see if the new arrival time is greater than three bit cells (the size of one half of the window read time, e.g., MST/4) from the offset previous bit time (block 411) and, if not, it checks to see if the prevous bit was a clock bit (block 413). If not, the program calculates a correction factor CORR equal to the MST divided by 2. If the previous bit was a clock bit, the correction factor CORR is set equal to zero. The correction factor is required because in the FM phase locked loop only clock bits are used. If the arrival time at block 411 is found to be greater than 3-bit cells, the arrival time is then checked to see if it is greater than 5-bit cells (block 416). If not, the arrival time is between 3- and 5-bit cells, and the correction factor is set equal to MST divided by 2 at block 414 (in this case the data bit was a zero); if so, there are too many bit cells separating the bits and an error message is provided (417), indicating that the reference position of the data has been lost.

After the correction factor has been calculated as given in block 414, the actual arrival time in the window is calculated for either a data or clock bit as shown in block 418, where OFF is the offset time from the start of the first window to the time of the first bit which is calculated to position the sequence of windows with respect to the arrival times in accordance with a least squares fit, T(i) is the separation time of the bits where T(0) equals 0, and DATATIME is the separation time between the present bit and the previous bit. The arrival time is then saved in memory (block 419) and if the current bit is a clock bit (block 420) the previous MAX number of bits in the timing filter is shifted over a clock bit and the first bit in the sequence is dumped. The program then returns to block 406 to calculate the mean window and repeat the loop again. If the previous bit was not a clock bit as determined at block 420, the program returns to block 408 and gets the next bit without calculating a new mean window size.

It will be seen that the cycling through the loops provided in FIG. 21 compensates for systematic changes in the frequency of the bits being read so that the calculated arrival times with respect to the window margins are not substantially affected by the systematic changes in frequency.

The flow chart for the simulation of the phase lock loop for modified frequency modulation encoding is shown in FIG. 22. A first group (having MAX entries) of separation times is obtained (block 422), the mean separation time and mean window are calculated (423), and the separation times are positioned in the windows using a least squares fit (block 424). A check is then made to see if all separation times have been finished (block 425) and, if so, the program returns to the main program of FIG. 20. If all separation times are not yet finished, the next bit is obtained and the separation time is adjusted correcting the separation times to account for the position of the previous bit not arriving in the center of the window as shown in block 426. If the previous bit was a clock bit (block 428) and the separation time as adjusted is greater than 5 bit cells (i.e., MST/4) (block 429), the arrival time is then checked to determine if it is greater than 7 bit cells (block 430). If so, an error has occurred and an error message is provided (431) before the program returns. If the separation time is not greater than 7 bit cells, this indicates that the current bit is a data bit was preceded by a clock bit and the current separation time is reduced by MST/2 to account for the extra separation time due to a clock-data transition, and the arrival time is calculated as set out in block 433 where OFF is the offset time calculated in accordance with the least square fit. If at block 429, the separation time was found not to be greater than 4 bit cells, a clock bit preceded by a clock bit is indicated, and the arrival time is calculated (block 435) in the same manner as the arrival time is calculated by the expression given in block 433.

If at block 428 the previous bit was found not to be a clock bit, the separation time is then checked to see if it is less than 5 bit cells (436); if so, a data bit followed by a data bit is indicated, and the arrival time is calculated in the window (block 437). If the separation time is not less than 5 bit cells but is less than 7 bit cells as determined at block 438, a clock bit preceded by a data bit is indicated, the current separation time is reduced by MST/2 and the arrival time is calculated (439). If the arrival time is greater than 7 bit cells, but less than 9 bit cells as checked at block 440, a sequence of a data bit followed by a zero followed by a data bit is indicated and the current separation time is reduced by MST and used to calculate the arrival time (block 441). If the arrival time is not less than 9 bit cells, an error is indicated and a message is provided (442) before the return of the program to the steps of FIG. 20.

After calculation of the arrival times as described above, the last MAX bits in the filter are shifted by one location (block 444), the arrival times are saved (block 445), and the program returns to calculate the mean window at block 423 and will continue to loop until all arrival times have been finished.

It is understood that the invention is not confined to the particular construction and arrangement of parts or the steps described herein, but embraces such modified forms thereof as come within the scope of the following claims.

What is claimed is:

1. A method of testing a disk drive unit in cooperation with a test disk in the drive unit to evaluate a selected performance characteristic of the disk drive unit, comprising the steps of:
    (a) operating the disk drive unit such that a selected test is performed on the drive unit in cooperation with the test disk and signal indicative of the performance of the drive unit on the test is provided by the drive unit;

(b) comparing the signal from the drive unit to a predetermined specification for the signal to determine a performance variable which is related to the deviation of the signal from the drive unit from the specification for the signal;

(c) displaying to the operator on a display device a graphics field which defines a peformance reference frame including a geometric target position corresponding to the reference specification, a geometric pass range, and a geometric fail range;

(d) displaying to the operator a cursor figure on the display device which is superimposed on the graphics field and which is displaced geometrically from the target specification position by a distance which is directly related to the performance variable, wherein the drive unit has a photodetector which provides an output index pulse once every revolution of the diskette, and wherein the selected test performed on the drive unit is determination of spindle rotation speed in which the output index pulses from the photodetector in the drive unit are counted to determine the spindle rotation speed, and wherein the spindle rotation speed so determined is compared to a predetermined specification speed for the signal to determine a spindle rotation performance variable, and wherein a reference frame is displayed to the operator including a linear scale representing a range of spindle rotational speeds and a pass band of speeds within that range centered about the specification speed, and wherein a cursor figure is superimposed on the graphics field above the linear scale which is displaced from the position on the scale of the specification speed a distance proportional to the spindle rotation performance variable.

2. A method of testing a disk drive unit having a reading head in cooperation with a test disk in the drive unit to evaluate a selected performance characteristic of the disk drive unit, comprising the steps of:

(a) operating the disk drive unit such that a selected test is performed on the drive unit in cooperation with the test disk and a signal indicative of the performance of the drive unit on the test is provided by the drive unit;

(b) comparing the signal from the drive unit to a predetermined specification for the signal to determine a performance variable which is related to the deviation of the signal from the drive unit from the specification for the signal;

(c) displaying to the operator on a display device a graphics field which defines a peformance reference frame including a geometric target position corresponding to the reference specification, a geometric pass range, and a geometric fail range;

(d) displaying to the operator a cursor figure on the display device which is superimposed on the graphics field and which is displaced geometrically from the target specification position by a distance which is directly related to the performance variable, wherein the selected test performed on the drive unit is determination of the track 00 switch position, and wherein the signal provided from the drive unit is the output from the track 00 switch which is sensed as the head is moved past the track 00 sensor switch position, and wherein the position at which the track 00 switch triggers with respect to the tracks on the test diskette is compared with a specification track position at which the track 00 switch should be triggered to determined a performance variable directly related to the difference between the sensed track 00 sensor position and its specification position, and wherein a graphics field is displayed to the operator composed of a linear scale with gradations thereon indicating the relative position of the outer tracks on the diskette including track 00, and a pass band centered about the desired track position of the track 00 switch, and wherein the cursor figure superimposed on the graphics field is a cursor arrow above the linear scale which is displaced along the scale away from the specification track position from the track 00 switch a distance proportional to the performance variable.

3. A method of testing a disk drive unit having a reading head in cooperation with a test disk in the drive unit to evaluate a selected performance characteristic of the disk drive unit, comprising the steps of:

(a) operating the disk drive unit such that a selected test is performed on the drive unit in cooperation with the test disk and a signal indicative of the performance of the drive unit on the test is provided by the drive unit;

(b) comparing the signal from the drive unit to a predetermined specification for the signal to determine a performance variable which is related to the deviation of the signal from the drive unit from the specification for the signal;

(c) displaying to the operator on a display device a graphics field which defines a peformance reference frame including a geometric target position corresponding to the reference specification, a geometric pass range, and a geometric fail range;

(d) displaying to the operator a cursor figure on the display device which is superimposed on the graphics field and which is displaced geometrically from the target specification position by a distance which is directly related to the performance variable, wherein the selected test performed on the drive unit is index pulse sensor position, wherein the diskette contains an opening therein to allow light to pass therethrough to trigger an index pulse photodetector in the drive unit and has data recorded on a track on the disk at a predetermined position with respect to the index hole in the disk, and wherein the time difference between the time that the index pulse signal received from the photodetector and the time of sensing by the reading head of the signal recorded on the disk is compared to a specification time difference for the signal to determine a performance variable directly related to the difference between the specification time delay and the actual time delay, wherein the graphics field displayed to the operator is composed of a linear scale with gradations thereon and a pass band on the linear scale centered about the position of the desired delay time, and wherein the cursor figure displayed to the operator is a figure superimposed above the linear scale which is displaced along the scale from the specification time delay a distance proportional to the performance variable.

4. A method of testing a disk drive unit having a reading head in cooperation with a test disk in the drive unit to evaluate a selected performance characteristic of the disk drive unit, comprising the steps of:

(a) operating the disk drive unit such that a selected test is performed on the drive unit in cooperation with the test disk and a signal indicative of the performance of the drive unit on the test is provided by the drive unit;

(b) comparing the signal from the drive unit to a predetermined specification for the signal to determine a performance variable which is related to the deviation of the signal from the drive unit from the specification for the signal;

(c) displaying to the operator on a display device a graphics field which defines a peformance reference frame including a geometric target position corresponding to the reference specification, a geometric pass range, and a geometric fail range;

(d) displaying to the operator a cursor figure on the display device which is superimposed on the graphics field and which is displayed geometrically from the target specification position by a distance which is directly related to the performance variable, wherein the selected test is the centering of the disk on the disk drive spindle, wherein there is a signal of constant amplitude written on one of the tracks of the test disk, and wherein the signal indicative of the performance of the drive unit is the reading signal from a head on the drive reading the signal track thereon, and wherein the magnitude of the signal from the drive unit is compared to a constant magnitude specification for the signal to determine the maximum deviation of the drive unit signal from the constant magnitude specification and a performance variable is calculated proportional to the magnitude of the maximum deviation of the drive unit signal from the constant magnitude signal, and wherein the graphics reference field displayed to the operator is a circular line corresponding by analogy to the central opening in the diskette, and wherein the cursor figure displayed to the operator is a smaller circle within the outer reference frame circle which is displaced from concentricity with the outer circle by a distance proportional to the performance variable indicative of the magnitude of the deviation from a constant signal and such that the outer reference frame circle defines the boundaries of the specification pass band area.

5. A method of testing a disk drive unit having a reading head in cooperation with a test disk in the drive unit to evaluate a selected performance characteristic of the disk drive unit, comprising the steps of:

(a) operating the disk drive unit such that a selected test is performed on the drive unit in cooperation with the test disk and a signal indicative of the performance of the drive unit on the test is provided by the drive unit;

(b) comparing the signal from the drive unit to a predetermined specification for the signal to determine a performance variable which is related to the deviation of the signal from the drive unit from the specification for the signal;

(c) displaying to the operator on a display device a graphics field which defines a peformance reference frame including a geometric target position corresponding to the reference specification, a geometric pass range, and a geometric fail range;

(d) displaying to the operator a cursor figure on the display device which is superimposed on the graphics field and which is displaced geometrically from the target specification position by a distance which is directly related to the performance variable, wherein the selected test performed on the drive is the test of the resolution of the reading heads, wherein the drive unit is operated to write signals on the disk at a lower frequency and a higher frequency on two tracks, and wherein the output signals indicative of the performance of the drive are the signals provided by the head when reading each of the two tracks, and wherein the amplitudes of the signals from the reading head for the two tracks are compared to each other to provide a ratio of amplitudes and wherein the ratio is compared to a predetermined specification for the ratio to determine a performance variable directly related to the magnitude of the deviation of the ratio from the specification ratio, and wherein a graphics reference field is displayed to the operator which is composed of inner and outer concentric circles defining between them a pass band for the ratio of the higher and lower frequency signals, and wherein the cursor figure superimposed on the graphics field is an array of concentric circular images which extend outwardly from a position within the inner circle to a position which is a radial distance outward which is directly proportional to the performance variable and such that the circular images will extend out into a position within the pass band between the two reference frame circles if the ratio is within specification and will be withdrawn within the inner circle or extend beyond the outer circle if the ratio is outside of specification.

6. A method of testing a disk drive unit having a reading head in cooperation with a test disk in the drive unit to evaluate a selected performance characteristic of the disk drive unit, comprising the steps of:

(a) operating the disk drive unit such that a selected test is performed on the drive unit in cooperation with the test disk and a signal indicative of the performance of the drive unit on the test is provided by the drive unit;

(b) comparing the signal from the drive unit to a predetermined specification for the signal to determine a performance variable which is related to the deviation of the signal from the drive unit from the specification for the signal;

(c) displaying to the operator on a display device a graphics field which defines a peformance reference frame including a geometric target position corresponding to the reference specification, a geometric pass range, and a geometric fail range;

(d) displaying to the operator a cursor figure on the display device which is superimposed on the graphics field and which is displaced geometrically from the target specification position by a distance which is directly related to the performance variable, wherein the selected test performed on the drive is the test of radial alignment of the disk drive head, wherein the test disk has a prerecorded tracks with the signal thereon recorded in a nonconcentric position on the disk such that the head, when reading the tracks, will provide an output signal having a magnitude varying in time with the displacement of the tracks toward and away from the head as the diskette rotates, and wherein the output of the reading head is the signal indicative of performance of the drive, and wherein the magnitude of the signal from the head over a revolution of the diskette is examined to locate the two maximum peaks of magnitude of the signal from the head which magnitude peaks are then compared to one another to provide a lobe ratio, and wherein the ratio is compared to a specification ratio to determine a performance variable which is directly proportional to the difference between the lobe ratio so determined and the specification ratio, and wherein the graphics field reference frame displayed to the operator is a linear scale with gradations thereon and intersecting portions of circular lines geometrically analogous to separate tracks on the disk, and wherein the cursor figure superimposed on the graphics field is a solid figure geometrically analogous to the head of the disk drive which is displaced along the linear scale away from the intersection of the circular line representing the desired track position a distance which is related to the performance variable.

7. The method of claim 6 in which the area covered by the cursor figure representing the head on the disk drive is chosen such that the radial head alignment of the head will be within specification as long as any part of the cursor figure representing the head intersects the circular line segment representing the track on which the head is to be centered.

8. A method of testing a disk drive unit having a reading head in cooperation with a test disk in the drive unit to evaluate a selected performance characteristic of the disk drive unit, comprising the steps of:
(a) operating the disk drive unit such that a selected test is performed on the drive unit in cooperation with the test disk and a signal indicative of the performance of the drive unit on the test is provided by the drive unit;
(b) comparing the signal from the drive unit to a predetermined specification for the signal to determine a performance variable which is related to the deviation of the signal from the drive unit from the specification for the signal;
(c) displaying to the operator on a display device a graphics field which defines a peformance reference frame including a geometric target position corresponding to the reference specification, a geometric pass range, and a geometric fail range;
(d) displaying to the operator a cursor figure on the display device which is superimposed on the graphics field and which is displaced geometrically from the target specification position by a distance which is directly related to the performance variable, wherein the selected test to be performed on the drive is the azimuth angle of the head with respect to a tangent to the tracks on the disk, and wherein the test disk has plural tracks of signals written on the disk over one revolution thereof at selected different angles with respect to a circle centered on the track to be read by the head such that the magnitude of the signal from the disk read by the head will vary in relationship to the angle of the data written with respect to the head, and wherein the signal indicative of the performance of the drive is the output signal from the reading head, wherein the magnitudes of the bursts of signal read from the head as the head passes over each of the separate tracks of signals written on the disk are compared with one another in a selected sequence to define ratios between the burst magnitudes which are indicative of the orientation of the head with respect to the signals written on the disk, and wherein such ratios are compared to specification ratios to provide a performance variable which is directly related to the angle of deviation of the head with respect to a true circular track on the disk, and wherein the graphics field displayed to the operator includes a linear scale representing by analogy the track center line of a circular track on the disk and shaded sectors of a circular centered on the linear scale and extending over an area corresponding to the pass band of the specification for azimuth angle of the head, and wherein the cursor figure superimposed on the graphics field is a line which rotates about the center of the linear scale at the intersection of the shaded sectors therein and is displaced from the linear scale at an angle directly related to the performance variable indicative of the angle at which the head deviates from a true circular track on the disk.

9. A method of testing a disk drive unit having a reading head in cooperation with a test disk in the drive unit to evaluate a selected performance characteristic of the disk drive unit, comprising the steps of:
(a) operating the disk drive unit such that a selected test is performed on the drive unit in cooperation with the test disk and a signal indicative of the performance of the drive unit on test is provided by the drive unit;
(b) comparing the signal from the drive unit to a predetermined specification for the signal to determine a performance variable which is related to the deviation of the signal from the drive unit from the specification for the signal;
(c) displaying to the operator on a display device a graphics field which defines a peformance reference frame including a geometric target position corresponding to the reference specification, a geometric pass range, and a geometric fail range;
(d) displaying to the operator a cursor figure on the display device which is superimposed on the graphics field and which is displaced geometrically from the target specification position by a distance which is directly related to the performance variable, wherein the selected test performed on the drive unit is a test of the timing between data written on the disk as read by the head, and wherein the signal indicative of the performance of the drive is the output signal from the head composed of digital data, wherein the time between the bits in the data read by the head are determined and compensated to remove systematic large scale variations in timing between adjacent data bits, and wherein the data indicative of the compensated separation between data bits in samples read from the disk are arranged and grouped as a function of deviation from the mean of the compensated separation times to provide a distribution of the deviation of the sampled separation times from the calculated mean time, and wherein a Gaussian distribution is fit to the data so arranged and the Gaussian distribution is compared to specification window margins indicating the maximum deviation of bit timing from the mean which is allowed within specification to determine if the fitted Gaussian distribution intersects the specified window margins at a likelihood greater than a selected threshold value, and wherein a graphics reference field is displayed to the operator composed of a linear scale with gradations indicating the deviation of the bit separation times from the mean separation time and a vertical scale indicating the likelihood that a separation time will be found, and wherein the superimposed cursor figure is a curve of the sample of compensated separation times as a function of the deviation of the sample times from the mean separation time which may be used to predict the probability that a particular separatiion time will be found.

10. A disk drive testing apparatus for testing a disk drive unit having a reading head in cooperation with a test disk in the drive unit to evaluate selected performance characteristics of the disk drive unit, comprising:
   (a) means connected to the disk drive unit for controlling the operation of the drive unit in cooperation with the test disk such that the drive unit provides a signal indicative of the performance of the drive unit on a selected test;
   (b) a visual display means having a screen on which graphic information may be displayed which is responsive to control signals for displaying graphic patterns on the screen;
   (c) control means receiving the signal indicative of performance from the drive unit and a predetermined specification for the signal for comparing the signal from the drive unit and the predetermined specification for the signal to determine a performance variable which is related to the deviation of the signal from the drive unit from the specification for the signal and for providing control signals to the display means to control the same to draw a graphics field which defines a performance reference frame including a geometric target position corresponding to the reference specification, a geometric pass range, and a geometric fail range, and to further draw a cursor figure on the display screen which is superimposed on the graphics field and which is displaced geometrically from the target specification position by a distance which is directly related to the performance variable.

11. The apparatus of claim 10 wherein the control means includes a programmable microcomputer central processing unit, a random access memory for data, a read only memory which contains the program for operating the central processing unit, and a display random access memory which receives display data from the central processing unit into selected positions in the memory which correspond to pixel positions on the display screen and wherein the central processing unit changes the position of the cursor figure on the display screen as the performance variable changes by changing the content of the display memory at the pixel positions of the cursor in correspondence with the changes in the performance variable.

12. The apparatus of claim 11 further including a memory module which contains the performance specifications for the drive unit and which is connected to the central processing unit such that the central processing unit can access the desired performance specifications from the memory module for the selected test being performed on the disk drive unit.

13. The apparatus of claim 12 wherein the memory module is an electronically erasable programmable read only memory and wherein the memory module is detachable from the apparatus to allow another memory module containing different performance specifications for another disk drive unit to be inserted therein and connected to the central processing unit in the apparatus.

14. The apparatus of claim 10 wherein the means for controlling operation of the disk drive does so to test a performance characteristic which is the relative displacement of a physical part of the disk drive unit from its nominal position, and wherein the control means controls the display means to provide a graphics field reference frame to the operator which is a simplified schematic representation of a reference on the test disk with respect to which the physical part is displaced and further controls the display means such that the cursor figure superimposed on the grahics field is a simplified geometric representation of the physical part which is so displaced, whereby the displacement on the display screen of the cursor figure with respect to the reference frame is a geometric analogy to the actual displacement of the physical part.

15. The apparatus of claim 10 wherein the means for controlling operation of the disk drive controls the disk drive to determine the spindle rotation speed and in which the signal indicative of performance of the drive unit is the output index pulses from a photodetector in the drive unit which provides an output pulse once every revolution of the disk, and wherein the control means counts the output index pulses from the photodetector to determine the spindle rotation speed and compares the spindle rotation speed so determined to a predetermined specification speed to determine a spindle rotation performance variable, and provides control signals to the display means to display a reference frame to the operator which includes a linear scale representing a range of spindle rotation speeds and a pass band of speeds within that range centered about a specification speed, and to display a cursor figure superimposed on the graphics field above the linear scale which is displaced from the position on the scale of the specification speed a distance proportional to the spindle rotation performance variable.

16. The apparatus of claim 10 wherein the means for controlling operation of the disk drive operates it to rotate the test disk to allow a test of track 00 switch position and wherein the signal provided from the drive unit to the apparatus is the output from the track 00 switch which is sensed as the head is moved past the track 00 sensor switch position in the drive unit, and wherein the control means compares the signal from the drive unit indicative of the position at which the track 00 switch triggers with respect to the tracks on the test disk to a specification track position at which the track 00 switch should be triggered to determine a performance variable directly related to the difference between the sensed track 00 sensor position and its specification position, and provides control signals to the display means to display a graphics field composed of a linear scale with gradations thereon indicating the relative position of the outer tracks on the disk including track 00, a pass band centered about the desired track position of the track 00 switch, and to display the cursor figure superimposed on the graphics field as a cursor arrow positioned above the linear scale which is displaced along the scale away from the specification track position for the track 00 switch a distance proportional to the performance variable.

17. The apparatus of claim 10 wherein the means for controlling the operation of the disk drive causes it to perform index pulse timing of the index sensor of the drive unit, wherein the disk in the drive unit contains an opening therein to allow light to pass therethrough to trigger an index pulse photodetector in the drive unit and has data recorded on a track on the disk at a predetermined position with respect to the index hole of the disk, and wherein the signals indicative of performance are the index pulse signal and the head reading signal which provides reading of the data recorded on the track on the disk, and wherein the control means determines the time difference between the time that the index pulse signal is received from the photodetector in the drive unit and the time of sensing by the head of the signal recorded on the disk and compares the time difference to a specification time difference for the signal to determine a performance variable directly related to the difference between the specification time difference and the actual time difference, and wherein the control means provides control signals to the display means to provide a display field which is composed of a linear scale with gradations thereon and a pass band on the linear scale centered about the position of the desired time delay, and wherein the cursor displayed to the operator is a figure superimposed above the linear scale which is displaced along the scale from the specification time delay a distance proportional to the performance variable.

18. The apparatus of claim 10 wherein the means for controlling the operation of the disk drive unit does so to test the drive unit for centering of the disk on the disk drive spindle, wherein there is a signal of constant amplitude written on one of the tracks of the test disk, and wherein the signal indicative of the performance of the drive unit received by the apparatus is the reading signal from a head on the drive reading the signal track thereon, and wherein the control means compares the magnitude of the signal from the drive unit to a constant magnitude specification for the signal to determine the maximum deviation of the drive unit signal from the constant magnitude specification and to determine a performance variable proportional to the magnitude of the maximum deviation of the drive unit signal from the constant magnitude signal, and for providing control signals to the display means to display a graphics reference field to the operator composed of a circular line corresponding by analogy to the central opening in the diskette and a cursor figure composed of a smaller circle within the outer reference frame circle which is displaced from concentricity with the outer circle by a distance proportional to the performance variable indicative of the magnitude of the deviation from a constant signal and such that the outer reference frame circle defines the boundaries of the specification pass band area.

19. The apparatus of claim 10 wherein the means for controlling operation of the drive unit does so to test the resolution of the reading head, wherein the test disk has two tracks of signals written thereon at a lower frequency and a higher frequency, and wherein the output signals from the drive unit provided to the apparatus which are indicative of the performance of the drive are the signals provided by the head when reading each of the two tracks and wherein the drive unit is controlled to move the head to read one of the tracks and then the other, and wherein the control means compares the amplitudes of the signals from the reading head for the two tracks to each other to provide a ratio of amplitudes and wherein the ratio is compared to a predetermined specification for the ratio to determine a performance variable directly related to the magnitude of the deviation of the ratio from the specification ratio, and wherein the control means provides control signals to the display means to display a graphics field which is composed of inner and outer concentric circles defining between them a pass band for the ratio of the higher and lower frequency signals and a cursor figure superimposed on the graphic field which is an array of concentric circular images which extend outwardly from a position within the inner circle to a position which is a radial distance outward directly proportional to the performance variable and such that the circular images will extend out into a position within the pass band between the two reference frame circles if the ratio is within specification and will be withdrawn within the inner circle or extend beyond the outer circle if the ratio is outside of specification.

20. The apparatus of claim 10 wherein the means for controlling operation of the drive unit does so to provide a test thereon of radial alignment of the disk drive head, wherein the test disk has a prerecorded track with the signal thereon recorded in a non-concentric path on the disk such that the head, when reading the track, will provide an output signal to the apparatus having a magnitude varying in time with the displacement of the track toward and away from the head as the disk rotates, and wherein the control means examines the magnitude of the signal from the head over a revolution of the disk to locate the two maximum peaks of magnitude therein and to compare the peaks to one another to provide a lobe ratio of the magnitude of the peaks, and wherein the lobe ratio is compared to a specification ratio to determine a performance variable which is directly proportional to the difference between the lobe ratio so determined and the specification ratio, and wherein the control means provides control signals to the display means to provide a graphics reference frame which is composed of a linear scale with gradations thereon and intersecting portions of circular lines geometrically analogous to separate tracks on the disk, and for superimposing a cursor figure on the graphics field which is a solid figure geometrically analogous to the head of the disk drive and which is displaced along the linear scale away from the intersection of the circular line representing the desired track position a distance which is related to the performance variable.

21. The apparatus of claim 20 in which the area covered by the cursor figure representing the head on the disk drive is chosen such that the radial head alignment of the head will be within specification as long as any part of the cursor figure representing the head intersects the circular line segment representing the track on which the head, is to be centered.

22. The apparatus of claim 10 wherein the means for controlling operation of the drive unit does so to provide a selected test of the azimuth angle of the head with respect to a tangent to the tracks on the disk, and wherein the test disk has plural tracks of signals written on the disk over one revolution thereof at selected different angles with respect to a circle centered on the track to be read by the head such that the magnitude of the signal from the disk read by the head will vary in relationship to the angle of the data written with respect to the head, and wherein the output signal from the reading head indicative of the performance of the drive is supplied to the apparatus, wherein the control means compares the magnitudes of the bursts of signal read from the head as the head passes over each of the separate tracks of signals written on the disk with one another in a selected sequence to define ratios between the burst magnitudes which are indicative of the orientation of the head with respect to the signals written on the disk, and wherein such ratios are compared to specification ratios to provide a performance variable which is directly related to the angle of deviation of the head with respect to a true circular track on the disk, and wherein the control means provides control signals to the display means to provide a graphics field including a linear scale representing by analogy the track center line of a circular track on the diskette and shaded sectors of a circle centered on the linear scale and extending over an area corresponding to the pass band of the specification for azimuth angle of the head, and for providing a cursor figure superimposed on the graphics field which is a line which rotates about the center of the linear scale at the intersection of the shaded sectors therein and is displaced from the linear scale at an angle directly related to the performance variable indicative of the angle at which the head deviates from a true circular track on the disk.

23. The apparatus of claim 10 wherein the means for controlling operation of the drive unit does so to provide a selected test of the timing between data written on the disk as read by the head, and wherein the signal indicative of the performance of the drive unit is the output signal from the head composed of digital data, and wherein the control means determines the separation between the bits in the data read by the head and compensates the time difference separations to remove systematic large scale variations in timing between adjacent data bits, and arranges the data indicative of the compensated separation between data bits in samples read from the disk and groups the compensated separation times as a function of deviation from the mean of the compensated separation times to provide a distribution of the deviation of the sampled separation times from the calculated mean time, and werein a Gaussian distribution is fitted to the data so arranged and the Gaussian distribution is compared to specification window margins indicating the maximum deviation of bit timing from the mean which is allowed within specification to determine if the fitted Gaussian distribution intersects the specified window margins at a likelihood greater than a selected threshold value, and wherein the control means provides control signals to the display means to provide a graphics field composed of a linear scale with gradations indicating the deviation of the bit separation times from the mean separation time and a vertical scale indicating the likelihood that a separation time will be found, and providing a superimposed cursor figure composed of a curve on the graphics field which is the compensated separation time from the sample as a function of the deviation of the bit separation time from the mean separation time which may be used to predict the probability that a particular separation time will be found.

24. A method of estimating the likelihood of reading and writing errors of a disk drive unit having a reading head comprising the steps of:
 (a) operating the disk drive unit to write a selected data pattern on a track on a disk;
 (b) operating the disk drive unit to read the data pattern from the track on the disk on the disk and provide an output signal of digital data read by the head of the disk drive;
 (c) counting the separation time between adjacent bits in the signal from the head reading the pattern on the disk and storing the separation times in a memory:
 (d) determining a mean separation time of the separation times stored in memory;
 (e) determining arrival times within mean window periods centered on the mean separation times;
 (f) forming a histogram array composed of multiple cells dividing up the range of arrival times;
 (g) assigning to each cell the total number of arrival times which are within the boundaries of the cell; and
 (f) displaying the histogram curve of total counts versus arrival time on a display device to an operator.

25. The method of claim 24 wherein steps (a) to (c) are repeated and the number of arrival times in the new sample which fall into the particular cells of the histogram array are added to the previous number in the histogram array to provide a new total for each cell in the array and then clearing the previous histogram array curve from the display device and plotting the new histogram array on the display device showing the total number of separation times in each cell as a function of separation time.

26. The method of claim 24 including the steps of: calculating the sample mean and sample variance of the count in the histogram array as a function of arrival time from the mean and fitting a Gaussian distribution function to the mean and sample variance so calculated, and comparing the value of the Gaussian distribution at selected window margin times with a selected threshold likelihood, and providing a display to the operator of whether or not the Gaussian distribution so calculated is greater or less than the threshold at the selected window margins.

27. The method of claim 24 including before the step of forming the histogram array, the step of compensating the arrival times for systematic changes over time in the mean separation time and mean window.

* * * * *